(12) United States Patent
Miyata et al.

(10) Patent No.: US 8,829,754 B2
(45) Date of Patent: Sep. 9, 2014

(54) ELECTRIC ROTATING MACHINE

(71) Applicant: Hitachi, Ltd., Tokyo (JP)

(72) Inventors: Kenji Miyata, Hitachinaka (JP); Yoshihisa Ishikawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/677,918

(22) Filed: Nov. 15, 2012

(65) Prior Publication Data

US 2013/0069473 A1    Mar. 21, 2013

Related U.S. Application Data

(63) Continuation of application No. 13/285,044, filed on Oct. 31, 2011, now Pat. No. 8,334,629, which is a continuation of application No. 13/037,115, filed on Feb. 28, 2011, now Pat. No. 8,134,269, which is a continuation of application No. 12/897,378, filed on Oct. 4, 2010, now Pat. No. 7,915,778, which is a continuation of application No. 12/393,676, filed on Feb. 26, 2009, now Pat. No. 7,830,060.

(30) Foreign Application Priority Data

Mar. 11, 2008   (JP) .................................. 2008-060410
Feb. 2, 2009    (JP) .................................. 2009-021090

(51) Int. Cl.
*H02K 1/00*   (2006.01)

(52) U.S. Cl.
USPC ........................... 310/180; 310/179; 310/184

(58) Field of Classification Search
USPC ............... 310/179–180, 184–185, 198, 251.1
See application file for complete search history.

(56) References Cited

U.S. PATENT DOCUMENTS

| 4,100,444 A | 7/1978 | Boyd, Jr. |
| 5,214,336 A | 5/1993 | Schmidt et al. |
| 5,343,105 A | 8/1994 | Sakabe et al. |

(Continued)

FOREIGN PATENT DOCUMENTS

| CN | 2548352 Y | 4/2003 |
| EP | 0 840 429 A2 | 5/1998 |

(Continued)

OTHER PUBLICATIONS

Chinese Office Action dated Jan. 18, 2012 with partial English translation (8 pages).

(Continued)

*Primary Examiner* — Thanh Lam
(74) *Attorney, Agent, or Firm* — Crowell & Moring LLP

(57) ABSTRACT

An alternator comprising a rotor having plural magnetic poles in the circumferential direction; and a stator whose teeth are disposed opposite to the periphery of the rotor, with an air gap interposed between the rotor and the stator, wherein the coil conductors are wound on the stator so that two stator magnetic poles may be formed by two coil units of a phase wound around stator teeth within the range of 360 electrical degrees subtended by the magnetic poles of the rotor; each of the two coil units forming the stator magnetic poles spans an electrical angle less than 180 electrical degrees; the two coil turns forming the two stator magnetic poles are laid out so that they may not overlap each other; and the coil conductors are so wound that the adjacent stator magnetic poles exhibit opposite magnetic polarities.

10 Claims, 27 Drawing Sheets

(56) References Cited

U.S. PATENT DOCUMENTS

| | | | |
|---|---|---|---|
| 5,376,852 A | 12/1994 | Kawamura et al. | |
| 5,502,341 A | 3/1996 | Sato | |
| 5,559,385 A | 9/1996 | Yalovega et al. | |
| 5,691,590 A | 11/1997 | Kawai et al. | |
| 5,898,251 A * | 4/1999 | Mochizuki et al. | 310/179 |
| 6,285,104 B1 | 9/2001 | Nashiki | |
| 6,385,064 B1 | 5/2002 | Zhou et al. | |
| 6,703,747 B2 | 3/2004 | Kawamura | |
| 6,864,667 B2 | 3/2005 | Buening et al. | |
| 6,979,927 B2 * | 12/2005 | Kometani et al. | 310/193 |
| 7,088,063 B2 | 8/2006 | Kurosawa et al. | |
| 7,541,685 B2 | 6/2009 | Ooiwa | |
| 7,687,962 B2 | 3/2010 | Imai et al. | |
| 7,726,005 B2 * | 6/2010 | Stroebel et al. | 29/596 |
| 7,830,060 B2 * | 11/2010 | Miyata et al. | 310/180 |
| 7,915,778 B2 * | 3/2011 | Miyata et al. | 310/180 |
| 2007/0114871 A1* | 5/2007 | Imai et al. | 310/206 |
| 2010/0194230 A1 | 8/2010 | Naganawa et al. | |
| 2011/0018381 A1 | 1/2011 | Miyata et al. | |

FOREIGN PATENT DOCUMENTS

| | | |
|---|---|---|
| EP | 1 225 676 A1 | 7/2002 |
| JP | 54-128106 U | 9/1979 |
| JP | 57-148544 A | 9/1982 |
| JP | 60-128852 A | 7/1985 |
| JP | 61-199450 A | 9/1986 |
| JP | 61-162266 U | 10/1986 |
| JP | 63-213435 A | 9/1988 |
| JP | 5-30693 A | 2/1993 |
| JP | 6-165422 A | 6/1994 |
| JP | 6-284615 A | 10/1994 |
| JP | 7-143696 A | 6/1995 |
| JP | 2004-248434 A | 9/2004 |
| JP | 2010-183649 A | 8/2010 |

OTHER PUBLICATIONS

Japanese Office Action with Partial Translation dated Jan. 8, 2013 (5 pages).

Japanese Office Action with Partial Translation dated Sep. 3, 2013 (6 pages).

Extended European Search Report dated May 28, 2014 (6 pages).

* cited by examiner

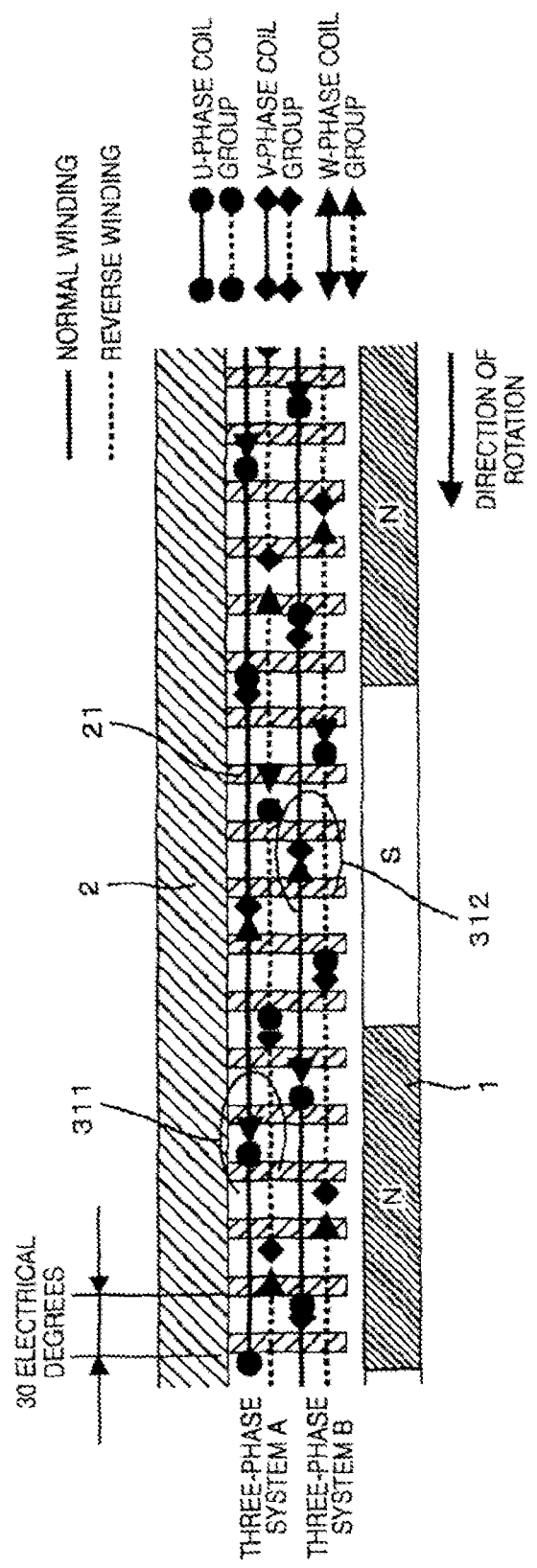

U-PHASE COIL GROUP OF THREE-PHASE SYSTEM A

U-PHASE COIL GROUP OF THREE-PHASE SYSTEM B

U-PHASE COIL GROUP OF THREE-PHASE SYSTEM A

U-PHASE COIL GROUP OF THREE-PHASE SYSTEM B

U-PHASE COIL GROUP OF THREE-PHASE SYSTEM A

DIRECTION OF ROTATION OF ROTOR

U-PHASE COIL GROUP OF THREE-PHASE SYSTEM B

DIRECTION OF ROTATION OF ROTOR

ELECTRIC ROTATING MACHINE

This application is a continuation of U.S. patent application Ser. No. 13/285,044, filed Oct. 31, 2011, which is a continuation of U.S. patent application Ser. No. 13/037,115, filed Feb. 28, 2011, now U.S. Pat. No. 8,134,269, issued Mar. 13, 2012, which is a continuation of U.S. patent application Ser. No. 12/897,378, filed Oct. 4, 2010, now U.S. Pat. No. 7,915,778, issued Mar. 29, 2011, which is a continuation of U.S. patent application Ser. No. 12/393,676, filed Feb. 26, 2009, now U.S. Pat. No. 7,830,060, issued Nov. 9, 2010, which in turn claims the priority of Japanese applications 2008-060410, filed Mar. 11, 2008 and 2009-021090, filed Feb. 2, 2009. The entire disclosure of each of the above-identified applications is incorporated herein by reference.

BACKGROUND OF THE INVENTION

This invention relates to an electric rotating machine and especially to an electric motor.

Coils of distributed winding and concentrated winding are well known as they are used as stator coils for electric rotating machines. For example, JP-A-6-165422 discloses the twin three-phase coil system comprising the first three-phase coil groups wound around the teeth of the stator core in the short pitch lap winding and connected with one another in the three-phase connection and the second three-phase coil groups wound around the teeth of the stator core in the short pitch lap winding and connected with one another in the same three-phase connection, the first three-phase coil groups being staggered by 60 electrical degrees from the second three-phase coil groups.

SUMMARY OF THE INVENTION

With the recent trend of energy conservation, it has come to be required to increase the efficiency in the performance of electric motors. Since the disclosed technique employs the concentrated winding structure in principle, the stator windings for a single phase link the magnetic flux generated by the rotor only within the range of 120 electrical degrees, having difficulty in obtaining higher efficiency as compared with the system using the distributed winding structure which links magnetic flux over 360 electrical degrees.

On the other hand, in the case of the distributed winding configuration, which includes full and short pitch windings, normally wound coils are substantially wound over 180 electrical degrees and reversely wound coils are wound over the remaining 180 electrical degrees, all the coils for the three-phase system being wound on the stator core. With this coil structure, the self-linking magnetic flux increases and therefore the resultant coil inductance becomes relatively large. Accordingly, if the coils of distributed winding are used on a generator, current generation is suppressed in the high-speed operating region. If they are used on an electric motor, the response in the control of coil current becomes poor.

According to this invention, it is possible to improve the electric characteristics of an electric motor.

According to one aspect of this invention, there is provided a stator within which a rotor is disposed with an air gap interpose between them, and in which coil conductor is wound such that two stator magnetic poles formed by two coil units of a phase are arranged within the range of 360 electrical degrees subtended by the magnetic poles of the rotor. It is preferable to cause each coil unit forming a stator magnetic pole to span an electrical angle less than 180 electrical degrees in the circumferential direction. It is also preferable to arrange the two coil units in such a manner that their coil turns do not overlap each other. It is further preferable to wind the coil conductor on the stator such that the two stator magnetic poles exhibit opposite magnetic polarities.

Other objects, features and advantages of the invention will become apparent from the following description of the embodiments of the invention taken in conjunction with the accompanying drawings.

BRIEF DESCRIPTION OF THE DRAWINGS

FIG. 10 schematically shows a third embodiment of an electric motor, with its air gap portion developed linearly along the circumferential direction of the rotor;

DETAILED DESCRIPTION OF THE EMBODIMENTS

Figure 1:
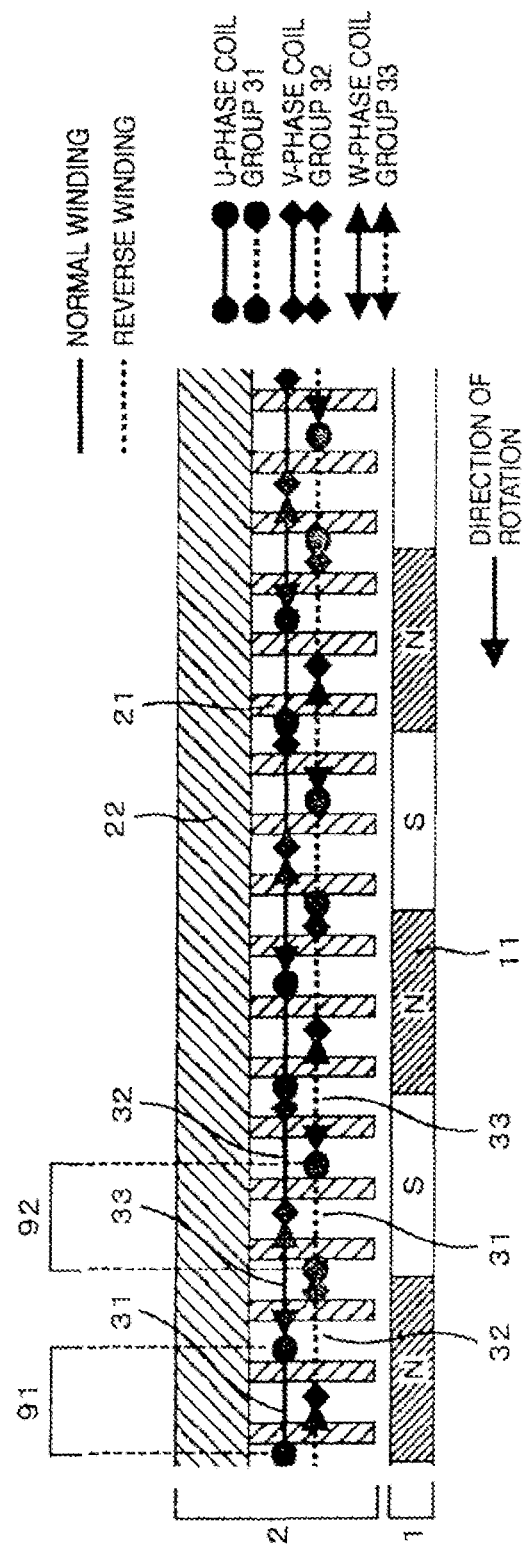
FIG. 1 schematically shows a first embodiment of an electric motor, with its air gap portion developed linearly along the circumferential direction of the rotor.

The following embodiments of this invention relate to electric rotating machines such as motors, generators and motor-generators having the functions of both a motor and a generator, which are widely used in power, industry, home and automobile applications.

Electric rotating machines such as generators and motors include various kinds of generators and motors such as, for example, induction motors, permanent magnet synchronous motors and direct current commutating motors. When such an electric rotating machine is used as a generator, the stator and the rotor are made up of windings and iron cores; DC current is made to flow through the windings on the rotor or the rotor is made of permanent magnet, so as to magnetize the rotor; rotating magnetic flux is passed throughout the stator by rotating the magnetized rotor; and magneto-motive force is induced in the windings wound on the stator.

The way of winding coil conductors around the stator teeth serving as stator magnetic poles includes distributed winding and concentrated winding.

The distributed winding includes full pitch winding and short pitch winding. In both of full and short pitch distributed windings, coil conductor is normally wound around teeth to form one coil unit substantially spanning 180 electrical degrees and then reversely wound around other teeth to form another coil unit spanning the remaining 180 electrical degrees. The coil sides of the coil units of all the phases are inserted in slots arranged within 180 electrical degrees. In case of such a distributed winding, the magnetic flux generated by the current flowing through any specific coil unit of the coil group for a phase links the turns of the coil units of the coil groups of other phases. Since the flux generated by a coil unit of a phase links the neighboring coil units of the same phase, the resultant coil inductance becomes relatively large. Accordingly, if the coils of distributed winding are used on a generator, current generation is suppressed in the high-speed operating region. If they are used on an electric motor, the response in the control of coil current becomes poor.

In case of the concentrated winding, on the other hand, the coil group of one phase is completely separated from the coil group of another phase, that is, the coil units of the coil group for a phase are wound around the teeth that are different from the teeth around which the coil units of the coil group for another phase are wound. The coil units of the coil group for a phase receive about all available flux generated from the stator divided by the number of phases, within the range of 360 electrical degrees. For example, in case of three phases, the flux received by the coil group for each phase is ⅓ of all the available flux. In order to increase the flux linkage, the number of turns of each coil unit must be increased. The increase in the number of turns leads to the increase in the resultant coil inductance, and hence, even in case of the concentrated winding, current generation is suppressed in the high-speed operating region of a generator while the response in the control of coil current becomes poor in a motor, just as in case of the distributed winding.

In addition, the concentrated winding has a problem that acoustic noise during rotation is relatively large due to the higher harmonic components of electromagnetic force resulting from the armature reaction caused by the current flowing through the stator coils. Since one of the main causes of the noise is the sixth higher harmonic component of electromagnetic force, two three-phase winding systems are employed and the phase difference $\phi$ between the two systems is made equal to 30 degrees so as to cancel the sixth higher harmonic component. Since the phase difference $\phi$ in the above mentioned conventional technique is 60 degrees, it is difficult for the prior art to suppress the sixth higher harmonic component that is one of the main causes of acoustic noise.

Further, since the related art mentioned above employs the concentrated winding in principle, the coil group for a phase, wound on the stator, can only utilize that part of the magnetic flux which is generated by the portion of the rotor within 120 electrical degrees, in case of a generator. Although the distributed winding can utilize the flux over 360 electrical degrees, the three-phase concentrated windings utilize only a partial amount of the flux.

According to the embodiments of this invention described below, copper loss can be reduced by eliminating the congregation of coil end portions at both the ends of the stator in its axial direction, so that the operating efficiency of an electric rotating machine can be increased.

According to the embodiments of this invention described below, the effect of reducing acoustic noise can be expected since the higher harmonic components of electromagnetic force can be made relatively small as compared with the case where the concentrated winding is employed.

According to the embodiments of this invention described below, in order to obtain the same induced voltage, that is, under the condition of the same mutual inductance with respect to the rotor, the self inductance of coil groups can be made smaller as compared with the case where the distributed or concentrated winding is employed. This is because, in the embodiments described below, the coil group for a phase utilizes only part of the flux generated by the rotor over 360 electrical degrees, as is different from the distributed winding that distributes coil turns all over the stator core. Namely, only a part of the flux which a particular coil group generates links that coil group itself. Since the area over which a particular coil group faces the magnetic poles of the rotor with the concentrated winding is half that which is observed with the corresponding coil group of the stator windings according to this invention, the number of turns in each coil unit must be increased to increase the induced voltage. Since coil inductance increases with the square of the number of coil turns, coil inductance according to the conventional technique is necessarily increased. According to the embodiments of this invention, since self inductances of coils can be made small, the characteristic of controlling coil currents can be improved in an electric motor while the characteristic of generating current can be improved in a generator.

As described in the following embodiments, if this invention is applied to an alternator for use on an automobile, whose rotational speed ranges from a lower limit of 2000 rpm up to a higher limit of 15000 rpm, excellent electrical characteristics can be obtained. The alternator for use on an automobile generates electric power on the basis of the rotational energy of an internal combustion engine to drive the automobile. Since the range of rotational speeds covered by such an alternator is very wide, the impedance resulting from the inductance of the stator coils becomes very high in the high speed operation range so that current generation is suppressed. This suppression of generated current causes the lowering of operating efficiency. According to the embodiments of this invention described below, the stator coil inductance can be prevented from becoming large, and therefore the characteristic of generating current in the high speed operating range can be improved.

In the foregoing description, explanation has been made of the improvement of electric characteristics, but in what follows below as the embodiments of this invention, problems other than those mentioned above will be solved and advantages other than those described above will be obtained. According to the following embodiments, the number of turns of each coil unit is small so that if the way of winding is applied to an alternator used on an automobile, productivity can be improved. For the reduction in size of an alternator for an automobile is strongly desired since it is installed on the vehicle. According to the following embodiments, the number of turns of each coil unit can be made small so that even if the size of the stator is reduced owing to the requirement for size reduction, productivity remains still high. Moreover, since the number of turns of each coil unit on the stator can be made small as compared with the conventional structure of stator coils, the way of structuring stator coils according to this invention can be easily matched to the needs for size reduction.

According to the following embodiments, since the number of connection points at which one coil unit or one coil group is connected with another coil unit or another coil group is small, productivity is excellent and high reliability can be maintained. Since alternators for automobiles are usually operated in such severe environments where they are exposed to the vibrations of the vehicle body due to the ruggedness of road surfaces or the repeated explosive internal combustion of the engine, or where they are exposed to temperatures ranging from below zero to above boiling point, it is preferable to make the number of points of connection as by welding as small as possible. Moreover, since the number of turns of each coil unit is small, the surface area of exposed coil conductors is large so that heat accumulation occurring as a result of some coil turns being buried among other coil turns can be easily prevented and therefore heat resistivity is excellent. From these many aspects contemplated above, the embodiments of this invention described in the following will be very suitable for application to an alternator for use on an automobile.

This invention will be described below by way of embodiments in reference to the attached drawings.

FIG. 1 schematically shows a first embodiment of an electric motor, with its air gap portion developed linearly along the circumferential direction of the rotor. The electric motor comprises a rotor 1 and a stator 2 in principle. The rotor 1 has plural rotor magnetic poles 11, and the stator 2 has plural teeth 21 serving as stator magnetic poles. Coil units of U-phase coil group 31, V-phase coil group 32 and W-phase coil group 33 are wound around teeth 21 of the stator core. It should be noted here that the V-phase coil unit, i.e. an individual coil unit of the V-phase coil group, is the coil unit through which flows an alternating current having its phase lagging by 120 degrees (or leading by 240 degrees) from the phase of the current flowing through the U-phase coil unit, i.e. an individual coil unit of the U-phase coil group, and that the W-phase coil unit, i.e. an individual coil unit of the W-phase coil group, is the coil unit through which flows an alternating current having its phase lagging by 240 degrees (or leading by 120 degrees) from the phase of the current flowing through the U-phase coil unit. In FIG. 1, the direction of revolution of the rotor 1 is indicated by an arrow.

It should also be understood that solid line indicates the coil unit of normal winding (in which the coil conductor is wound around teeth clockwise as viewed radially from the rotor toward the stator), whereas broken line denotes the coil unit of reverse winding (in which the coil conductor is wound around teeth counterclockwise as viewed radially from the rotor toward the stator). As shown in FIG. 1, the coil units of normal winding are placed in the slots of the stator 2 remotely from the rotor 1, but they may be placed closer to the rotor 1 in the slots. Each phase coil group consists of a pair of concentrated-wound coil units distanced by 180 electrical degrees from each other within the range of 360 electrical degrees. The U-phase coil units are connected in series with one another, the V-phase coil units are connected in series with one another, and the W-phase coil units are connected in series with one another. In other words, the stator 2 is disposed opposite to the rotor 1, with a uniform air gap formed between them; the coil conductors are wound such that two coil units of a phase create two magnetic poles 91 and 92 within the region of 360 electrical degrees; each of the two coil units of a phase forming the stator poles 91 and 92 spans an electrical angle smaller than 180 electrical degrees in the circumferential direction of the rotor 1; the coil turns of the two coil units of a phase, forming the two magnetic poles 91 and 92, are placed in the stator slots in such a manner that they do not overlap each other; and the coil turns of the two coil units of a phase are so wound that the two magnetic poles 91 and 92 have opposite polarities. In this embodiment, the coil units wound around the two stator magnetic poles 91 and 92 are disposed at a distance of 180 electrical degrees from each other. And the stator magnetic poles for the U-, V- and W-phases are disposed at a distance of 60 electrical degrees from one another. The direction of winding coil conductor in each V-phase coil unit is opposite to the direction of winding coil conductor in each U-phase coil unit. Accordingly, the temporal phase of the V-phase coil unit lags the temporal phase of the U-phase coil unit by 120 degrees since +60 degrees−180 degrees=−120 degrees. On the other hand, since the direction of winding coil conductor in each W-phase coil unit is the same as the direction of winding coil conductor in each U-phase coil unit, the temporal phase of the W-phase coil unit leads the temporal phase of the U-phase coil unit by 2×60 degrees (=120 degrees). Also, in this embodiment, each individual coil turn spans 120 electrical degrees, and two coil turns of a phase span 240 electrical degrees, that is, two thirds of the entire teeth within the total 360 electrical degrees. This way of winding coil conductors will be hereafter termed "dispersed winding".

As a result of employing the dispersed winding, the stator winding according to this embodiment is featured by the individual coil turn that has its circuit area linking the magnetic flux issuing from the rotor, which circuit area is twice as large as that of the individual coil turn of the concentrated winding wherein a single concentrated-wound coil is provided within the range of 360 electrical degrees. Thus, the coil utility efficiency of the dispersed winding is twice as large as that of the concentrated winding. For obtaining the same amount of flux linkage, the number of turns of coil conductor wound, according to this embodiment, around, for example, a single stator magnetic pole may be half the corresponding number of turns in the concentrated winding. Each of the U-, V- and W-phase coil groups is dispersed over the range of electrical angles that is double the range of electrical angles for each of the U-, V- and W-phase coil groups in the concentrated winding. Further, different from the distributed winding wherein coil conductors are wound around all the teeth, coil conductors are wound around, according to this embodiment, two thirds of the entire teeth provided within 360 electric degrees. Accordingly, the coil inductance can be reduced as compared with that developed in the concentrated winding or the distributed winding.

Moreover, according to this embodiment, the degree of dispersion of coils is double that for the concentrated winding, and the U-, V- and W-phase coils are wound with an overlap percentage of about 50%. Accordingly, the armature reaction is distributed relatively uniformly along the periphery of the rotor in contrast to that observed with the concentrated winding, so that the higher harmonic components of electromagnetic force can be reduced. For this reason, electric motors employing the structure of winding according to this embodiment can operate with less sonic noise than electric motors employing the concentrated winding.

In the embodiment shown in FIG. 1, stator teeth are provided at an interval of 60 electrical degrees and each coil unit spans 120 electrical degrees. Alternatively, however, the same advantages can be obtained if stator teeth are provided at an interval of 30 electrical degrees and if each coil unit spans 90, 120 or 150 electrical degrees. Also, in other embodiments of this invention shown in FIGS. 2 through 9 and described below, in each of which a single three-phase system is exemplified, stator teeth are provided at an interval of 60 electrical degrees and each coil unit spans 120 electrical degrees. It, however, will be needless to say that the same advantages can be obtained if stator teeth are provided at an interval of 30 electrical degrees and if each coil unit spans 90, 120 or 150 electrical degrees.

Figure 2:
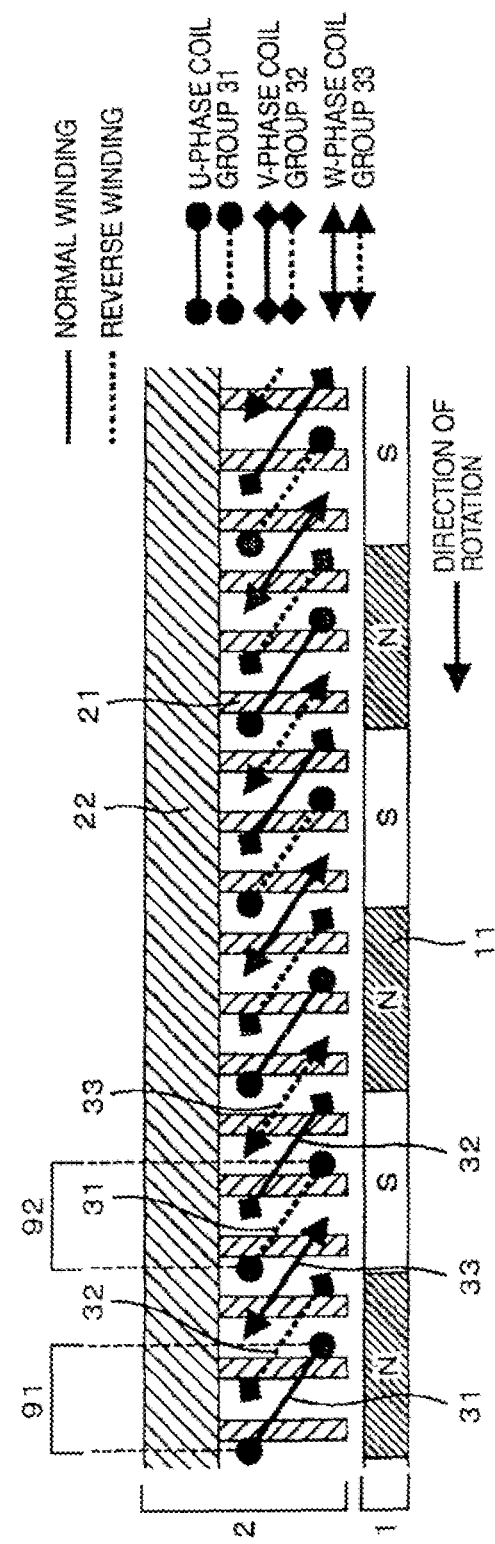
FIG. 2 schematically shows a second embodiment of an electric motor, with its air gap portion developed linearly along the circumferential direction of the rotor.
Figure 27:
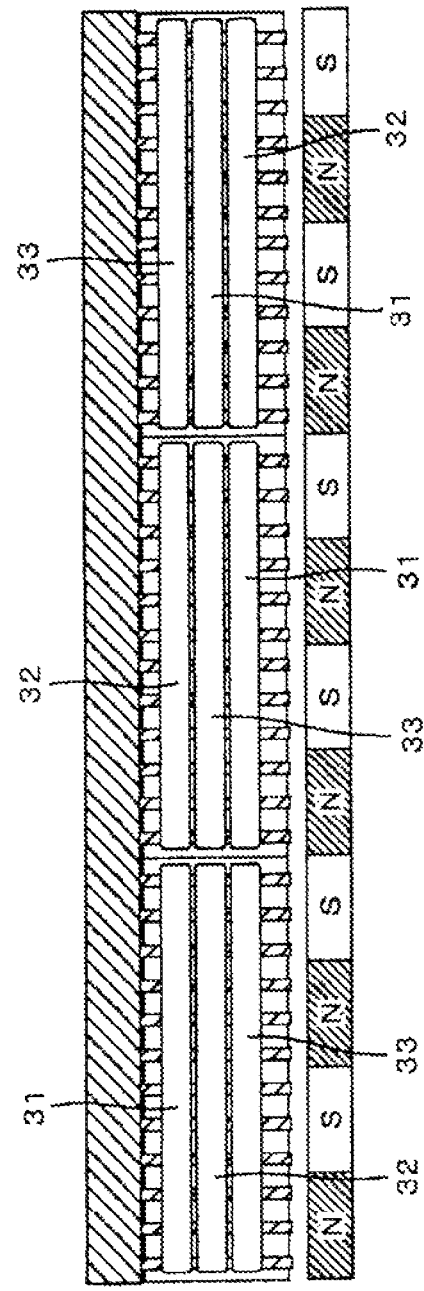
FIG. 27 pictorially represents in developed cross section the electric motor shown in FIG. 2.

FIG. 2 schematically shows a second embodiment of an electric motor, with its air gap portion developed linearly along the circumferential direction of the rotor. Except the items described below, this second embodiment is similar to the first embodiment described above. The way of winding the stator coils according to this embodiment is different from that according to the first embodiment. Every stator coil turn is wound around teeth 21 in such a manner that one coil side of a coil turn is disposed near the bottom of a slot while the other coil side of the same coil turn is disposed closer to the top of another slot. Namely, as viewed in the direction along the rotor shaft, the apparent parts of the coil turns appear slanting as shown in FIG. 2. Thus, the positions of all the coil elements in the radial direction are evenly distributed. In other words, the coil inductances of the respective phase coils are averaged by winding the coils in such a manner that one coil side of a coil turn is disposed near the bottom of a slot, i.e. remote from the rotor, while the other coil side of the same coil turn is disposed closer to the top of another slot, i.e. near the rotor. In the first embodiment described above, the respective phase coil units are evenly distributed around teeth 21 in the radial direction by being connected in series with one another, but, according to this embodiment, the respective phase coil units are evenly distributed before making such series connections. FIG. 27 pictorially represents the electric motor shown in FIG. 2. The coil layout within one third of the 360 electrical degree period repeats so that the phase coil units are distributed evenly over the entire circumferential distance.

The winding structure in which the respective phase coil groups are evenly distributed in the stator slots in the radial direction, is very preferable in configuring a uniform three-phase AC system.

Figure 3A:
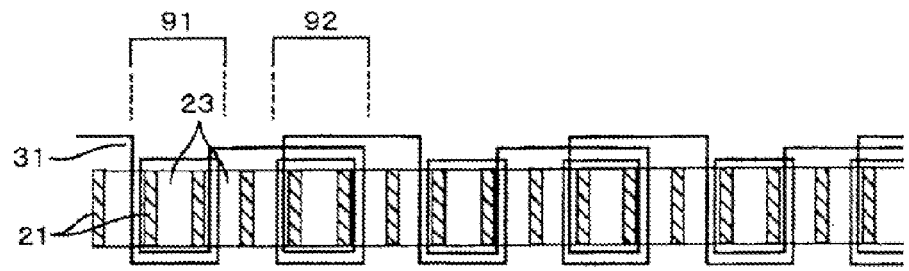
FIGS. 3A~3C show an example of how coils are wound on an electric motor according to this invention.
Figure 3B:
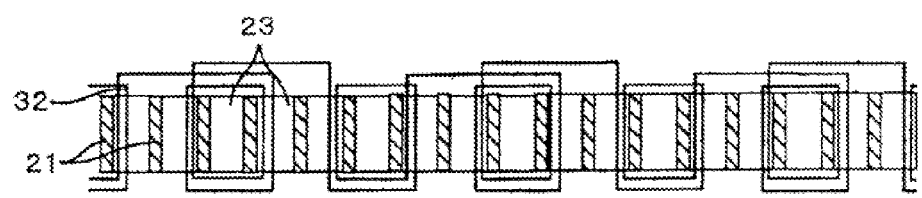
Figure 3C:
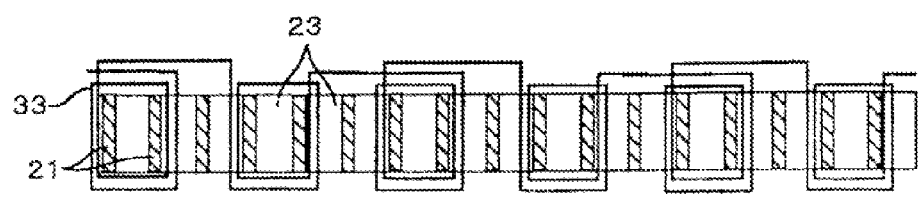

FIGS. 3A~3C show an example of how coils are wound on the electric motors according to this invention. FIGS. 3A~3C respectively show how the U-, V- and W-phase coil groups are wound around teeth, as viewed in the radial direction from the rotor toward the stator enclosing the rotor. As shown in these figures, for ease of understanding the way of winding coil conductors, the actual thickness of the coil conductor is ignored and the one coil turn conductor is spaced from another coil turn conductor. The horizontal direction in the figures corresponds to the circumferential direction of the stator. In this embodiment, six slots (six teeth) are provided at a regular distance within 360 electrical degrees, and therefore one slot (tooth) is shifted from another slot (tooth) by 60 electrical degrees.

In this embodiment shown in FIGS. 3A~3C, each of the coil units of each phase coil group has its coil conductor wound twice, and spans 120 electrical degrees (i.e. two teeth 21) to form a stator magnetic pole 91 for one of the three phases. After being wound twice around the teeth forming the magnetic pole 91, the coil conductor then leaves the slot where it was last inserted. After leaving the last inserted slot, the coil conductor is inserted in a slot that is distanced by 180 electrical degrees (i.e. three teeth 21) from the last inserted slot, and starts being wound twice around two teeth to form a stator magnetic pole 92. The resulting coil unit also spans 120 electrical degrees and the direction of winding the coil conductor is reverse to the direction of winding the coil conductor in the coil unit forming the magnetic pole 91. It should be noted here that "wound twice" means that two coil elements exist in each of the two slots in which each coil unit is inserted. Thus, these two coil units are in series connection with each other. With this winding configuration, the overall length of coil conductor can be minimized so that the copper loss can be greatly reduced.

According to this winding configuration, when all the three-phase coil groups are set in the entire slots formed between the teeth 21, the numbers of coil elements placed in the respective slots are the same throughout the stator. Therefore, the coil conductor distribution can be made uniform without local conductor concentration so that coils can be easily wound and the cooling of coils can be made uniform in ventilation cooling. It will be needless to say that even if the numbers of coil elements placed in different slots are not the same as one another, the coil structure of dispersed winding as employed in this embodiment can be employed.

In this embodiment, the total of four coil elements are inserted in a slot. In the case where the total number of coil elements set in a slot is even, the coil configuration of this embodiment can be applied.

Figure 4A:
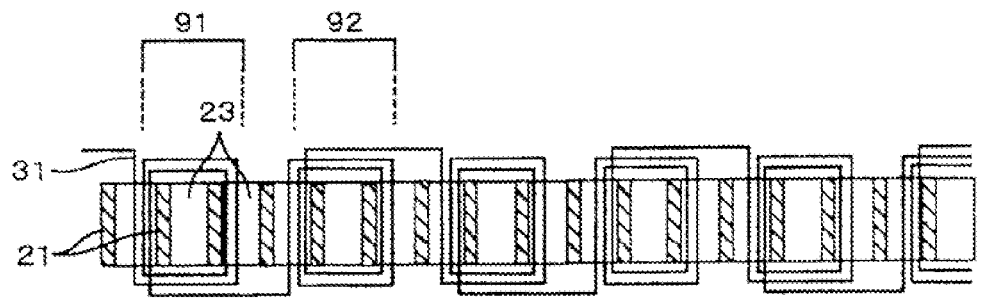
FIGS. 4A~4C show another example of how coils are wound on an electric motor according to this invention.
Figure 4B:
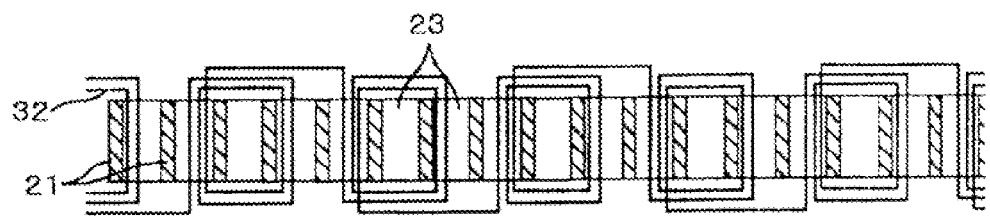
Figure 4C:
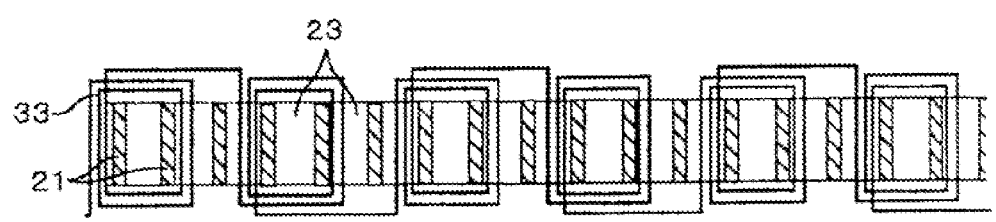

FIGS. 4A~4C show another example of how coils are wound on the electric motors according to this invention. Except the items described below, this example is the same as that described above.

In this example, each of the coil units of each phase coil group has its coil conductor wound two and a half times, and spans 120 electrical degrees (i.e. two teeth 21) in the circumferential direction to form a stator magnetic pole 91 for one of the three phases. After being wound 2.5 times around the teeth forming the magnetic pole 91, the coil conductor then leaves the slot where it was last inserted. After leaving the last inserted slot, the coil conductor is inserted in a slot that is distanced by 180 electrical degrees (i.e. three teeth 21) from the last inserted slot, and starts being wound two and a half times around two teeth to form a stator magnetic pole 92. The resulting coil unit also spans 120 electrical degrees and the direction of winding the coil conductor is reverse to the direction of winding the coil conductor in the coil unit forming the magnetic pole 91. It should be noted here that "wound two and a half times" means that two coil elements lie in one of the two slots in which a coil unit is inserted while three coil elements lie in the other of the same two slots. With this coil configuration, the coil end portions of all the coil units can be evenly disposed on both sides in the axial direction of the stator so that the local congregation of coil end portions can be prevented. In this example, the coil units each having the coil conductor wound two and a half times around teeth are described, but this example can equally be applied to the case where the number of conductor turns in each coil unit is equal to an integer plus half unity. Also, in this example, the total of five coil elements are inserted in each slot. Thus, this example can also be applied to the case where the number of coil elements inserted in each slot is odd.

Figure 5A:
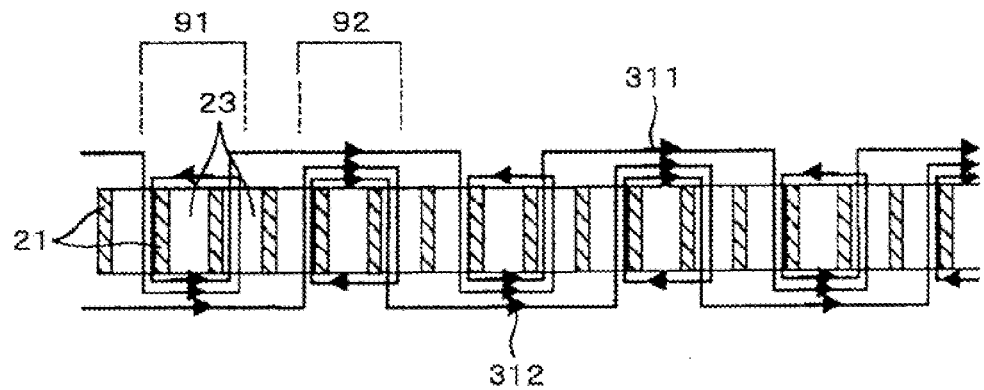
FIGS. 5A~5C show still another example of how coils are wound on an electric motor according to this invention.
Figure 5B:
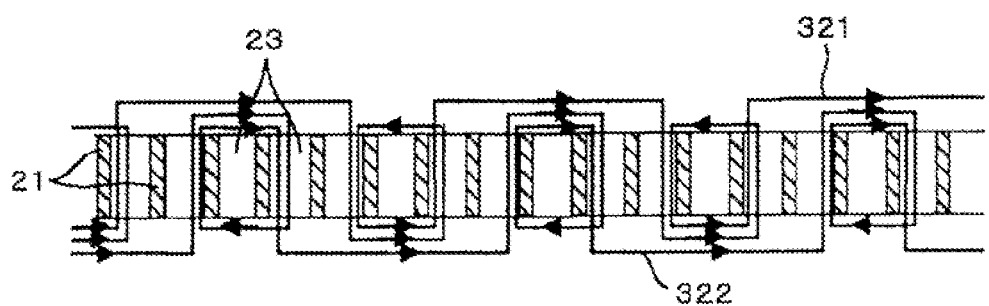
Figure 5C:
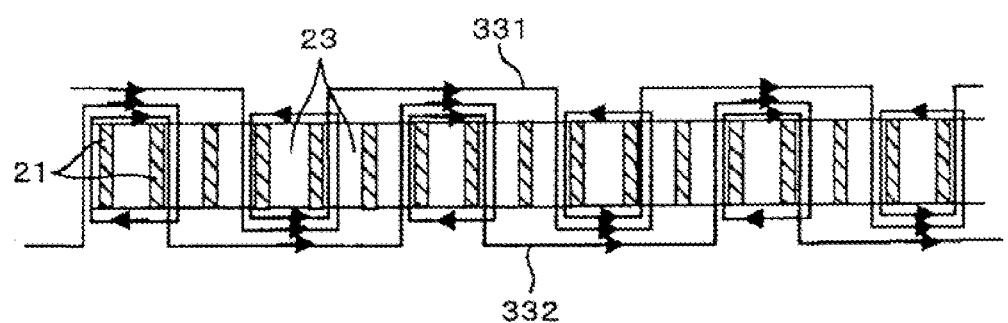

FIGS. 5A~5C show still another example of how coils are wound on the electric motors according to this invention. Except the items described below, this example is the same as in the embodiment described above. In these figures, arrows put on the coil conductors of two coil groups of each phase indicate the directions of currents flowing through the respective phase coil groups at a certain instant of time.

In this example, the normally wound coil group and the reversely wound coil group are separated from each other. Coil conductor is wound such that a normally wound coil unit spans 120 electrical degrees (or two teeth 21) in the circumferential direction to form a normally wound stator magnetic pole 91. The coil conductor of the normally wound coil unit leaves the last inserted slot; the coil conductor, after leaving the last inserted slot, enters a slot distanced by 240 electrical degrees (or four teeth 21) from the last inserted slot; and a coil unit having two conductor turns is formed by winding the coil conductor twice in the same direction as around the normally wound stator magnetic pole 91, to form another stator magnetic pole. In like manner, coil conductor is wound such that a reversely wound coil unit spans 120 electrical degrees (or two teeth 21) to form a reversely wound stator magnetic pole 92 within the region of 240 electrical degrees between the above described two normally wound coil units, so that the phase of the current through the coil unit wound around the reversely wound stator magnetic pole 92 is shifted by 180 degrees from the phase of the current through the coil unit around the normally wound stator magnetic pole 91. The coil conductor leaves the last inserted slot; the coil conductor, after leaving the last inserted slot, enters a slot distanced by 240 electrical degrees (or four teeth 21) from the last inserted slot; and a coil unit having two conductor turns is formed by winding the conductor twice in the same direction as around the stator magnetic pole 92.

It is preferable to connect the normally wound coil groups of three-phases in series with one another and to connect the reversely wound coil groups of three-phases in series with one another. By doing so, the end portions of all the coil units can be evenly disposed on both sides in the axial direction of the stator so that the local congregation of coil end portions can be prevented. In addition, the work of coil winging is facilitated so that this configuration is excellent in mass production.

In this example, the total of four coil elements are inserted in each slot. Thus, this example can also be applied to the case where the number of coil elements inserted in each slot is even.

Figure 6A:
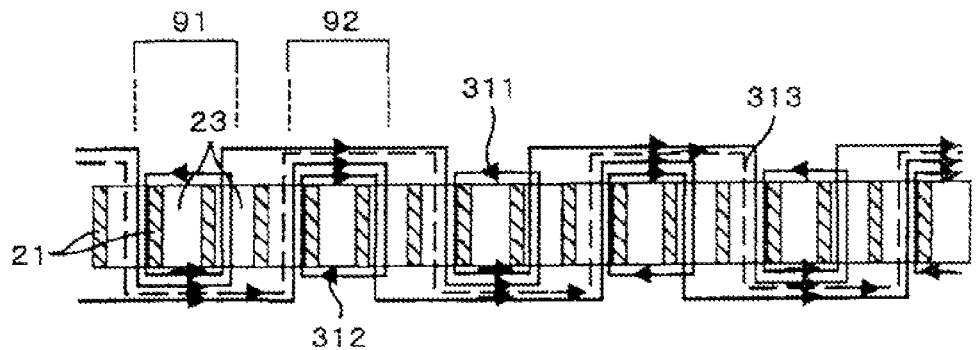
FIGS. 6A~6C show a further example of how coils are wound on an electric motor according to this invention.
Figure 6B:
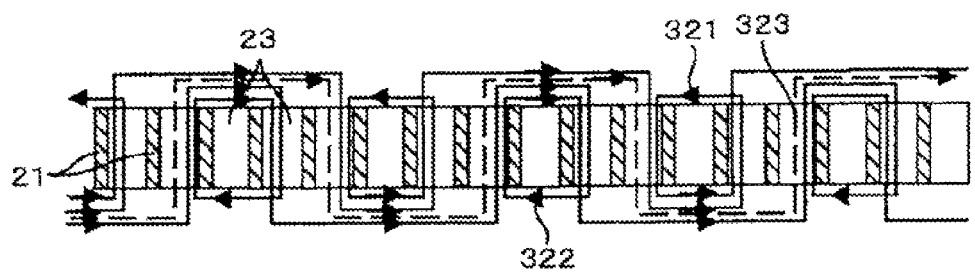
Figure 6C:
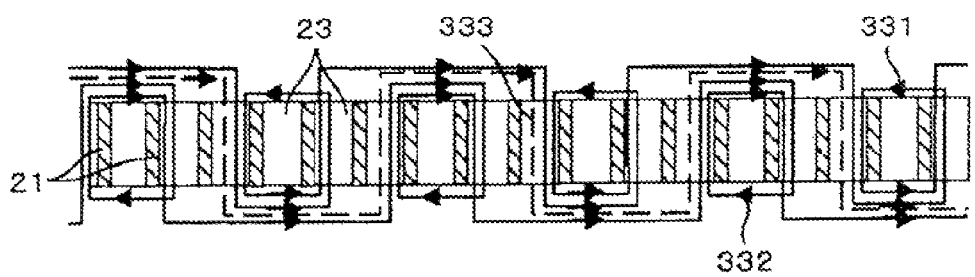

FIGS. 6A~6C show a further example of how coils are wound on the electric motors according to this invention. Except the items described below, this example is the same as the example described above. In these figures, arrows put on the coil conductors of two coil groups of each phase indicate the directions of currents flowing through the respective phase coil groups at a certain instant of time.

In this example, third coil groups, i.e. U-phase coil group 313, V-phase coil group 323 and W-phase coil group 333, are added to the coil structure as shown in FIGS. 5A~5C. The added coil group is in the wave winding, and each coil unit of the wave winding spans 180 electrical degrees so that the coil conductor passes through one of the slots in which the normally wound coil unit in FIG. 5 is set and one of the slots in which the reversely wound coil unit in FIG. 5 is set. This way of winding coil conductor may be said to be the hybrid of dispersed winding and distributed winding. This hybrid winding has a feature that higher harmonic components can be suppressed to an appreciable extent, this characteristic being an advantage obtained with the distributed winding.

In this example, the total of five coil elements are inserted in each slot. Thus, this example can also be applied to the case where the number of coil elements inserted in each slot is odd.

Figure 7A:
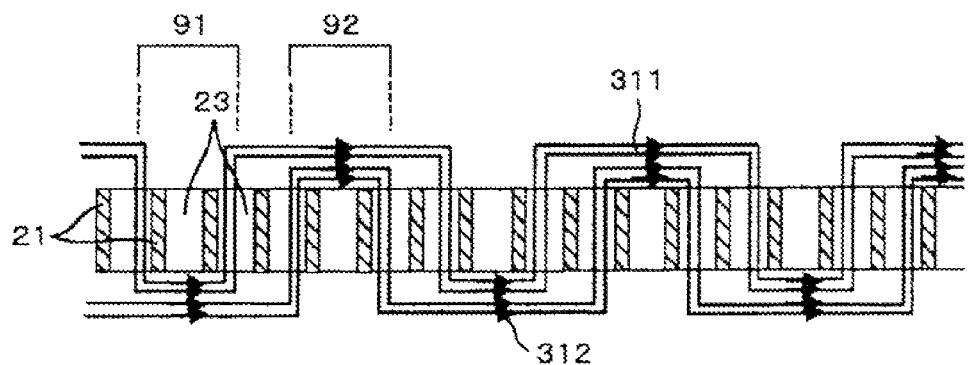
FIGS. 7A~7C show a still further example of how coils are wound on an electric motor according to this invention.
Figure 7B:
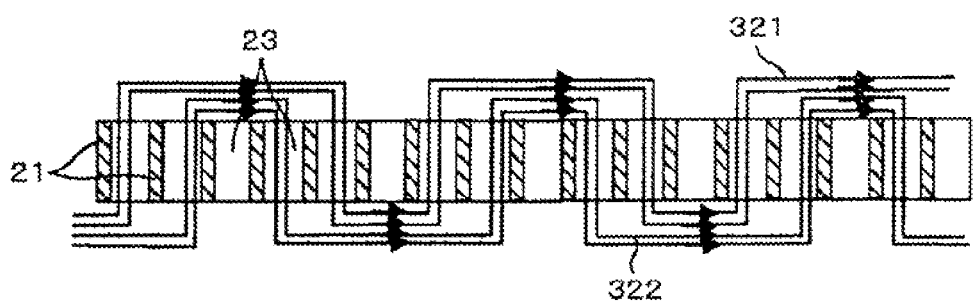
Figure 7C:
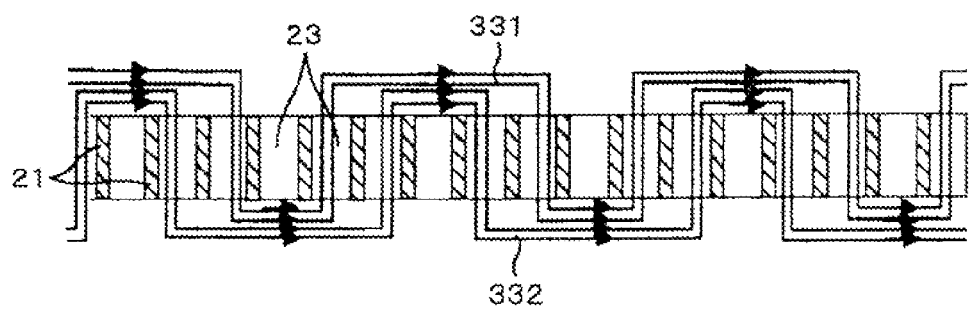

FIGS. 7A~7C show a further example of how coils are wound on the electric motors according to this invention. Except the items described below, this example is the same as in the embodiment described above. In these figures, arrows put on the coil conductors of four coil groups of each phase indicate the directions of currents flowing through the respective phase coil groups at a certain instant of time.

FIGS. 7A~7C show an example wherein the normally wound coil groups 311 and the reversely wound coil groups 312, the normally wound coil groups 321 and the reversely wound coil groups 322, and the normally wound coil groups 331 and the reversely wound coil groups 332, are separated from each other, respectively. Two normally wound coil units, both in the wave winding and inserted in the same pair of slots, span 120 electrical degrees (or two teeth 21) to form a normally wound stator magnetic pole 91. The coil conductors of the two normally wound coil units leave the last inserted slot; the coil conductors, after leaving the last inserted slot, enter a slot distanced by 240 electrical degrees (or four teeth 21) from the last inserted slot; and two coil units in the wave winding are formed by winding the coil conductors in the same direction as around the normally wound stator magnetic pole 91, to form another stator magnetic pole. In like manner, two reversely wound coil units, both in the wave winding and inserted in the same pair of slots, span 120 electrical degrees (or two teeth 21) to form a reversely wound stator magnetic pole 92 within the region of 240 electrical degrees between the above mentioned two slots, so that the phases of the currents through the coil units wound around the reversely wound stator magnetic pole 92 are shifted by 180 degrees from the phases of the currents through the coil units around the normally wound stator magnetic pole 91. The coil conductors of the two reversely wound coil units leave the last inserted slot; the coil conductors, after leaving the last inserted slot, enter a slot distanced by 240 electrical degrees (or four teeth 21) from the last inserted slot; and two coil units in the wave winding are formed by winding the conductors in the same direction as around the stator magnetic pole 92. The two coil groups inserted in the same pairs of slots may be connected in series or parallel with each other, but the coil group consisting of normally wound coil units and the coil group consisting of reversely wound coil units should preferably be connected in series with each other. By doing so, the end portions of all the coil units can be evenly disposed on both sides in the axial direction of the stator so that the local congregation of coil end portions can be prevented. In addition, since the wave winding process, not multiple encircling of teeth by winding conductors, is employed, the work of conductor winging is facilitated so that this configuration is excellent in mass production.

In this example, the total of four coil elements are inserted in each slot. Thus, this example can also be applied to the case where the number of coil elements inserted in each slot is even.

Figure 8A:
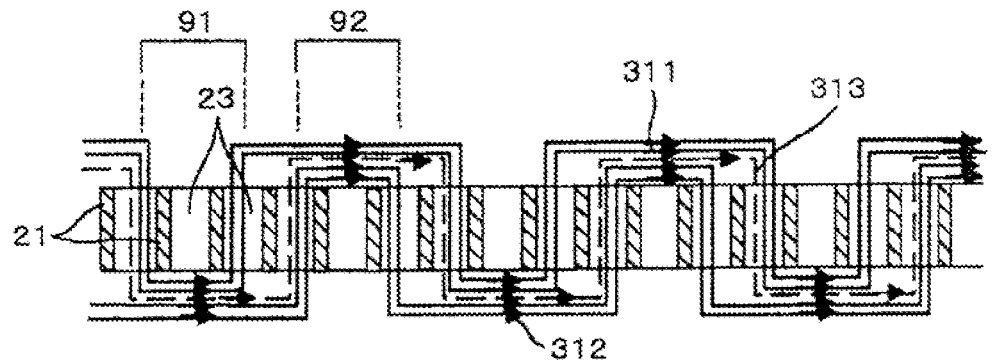
FIGS. 8A~8C show a yet further example of how coils are wound on an electric motor according to this invention.
Figure 8B:
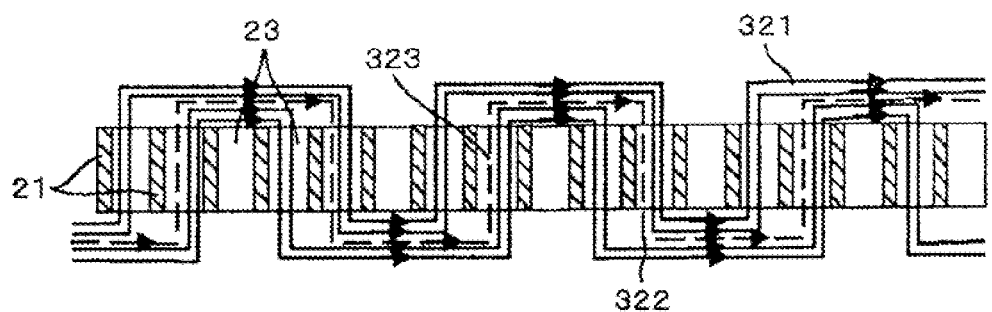
Figure 8C:
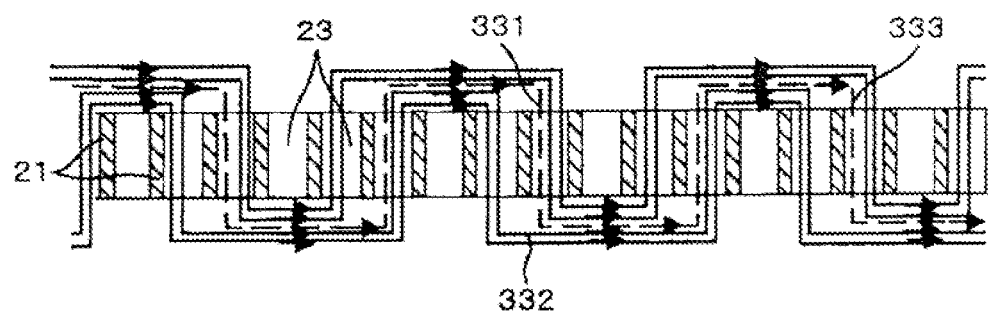

FIGS. 8A~8C show a yet further example of how coils are wound on the electric motors according to this invention. Except the items described below, this example is the same as the example described above. In these figures, arrows put on the coil conductors of five coil groups of each phase indicate the directions of currents flowing through the respective phase coil groups at a certain instant of time.

In this example, third coil groups, i.e. U-phase coil group 313, V-phase coil group 323 and W-phase coil group 333, are added to the coil structure as shown in FIGS. 7A~7C. The added coil groups are in the wave winding, and each coil unit of the wave winding spans 180 electrical degrees so that the coil conductor passes through one of the two slots in which the normally wound coil units in FIG. 7 are set and one of the two slots in which the reversely wound coil units in FIG. 7 are set. This way of winding coil conductor may be said to be the hybrid of dispersed winding and distributed winding. This hybrid winding can enjoy a characteristic that higher harmonic components can be suppressed to an appreciable extent, this characteristic being an advantage obtained with the distributed winding.

In this example, the total of five coil elements are inserted in each slot. Thus, this example can also be applied to the case where the number of coil elements inserted in each slot is odd.

Figure 9A:
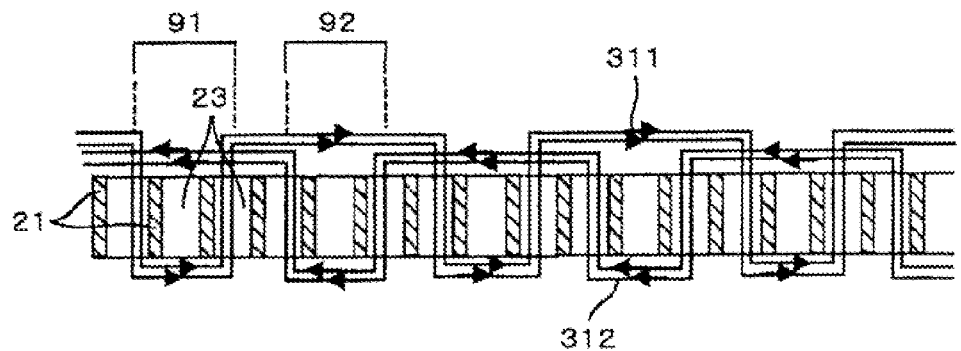
FIGS. 9A~9C show an additional example of how coils are wound on an electric motor according to this invention.
Figure 9B:
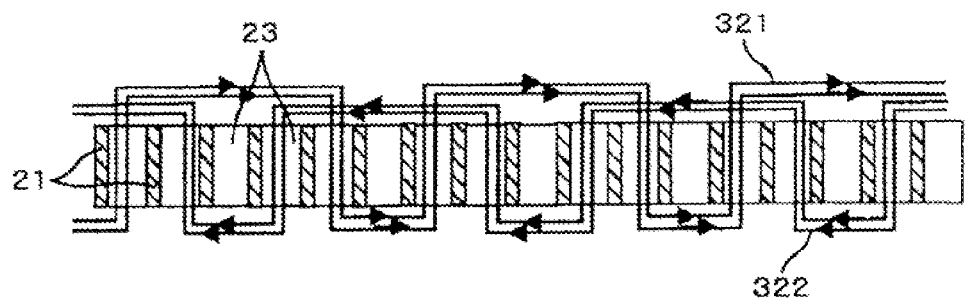
Figure 9C:
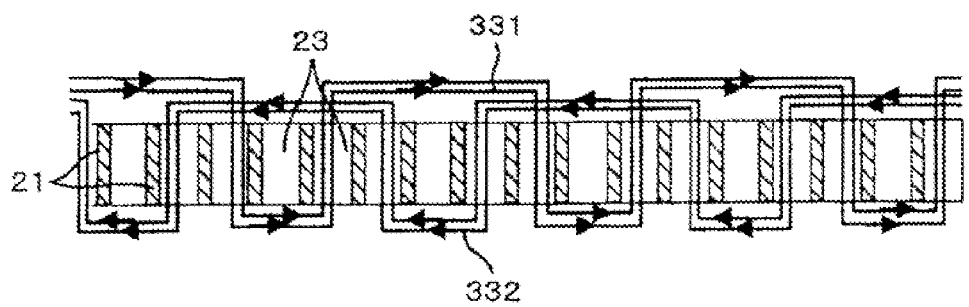

FIGS. 9A~9C show an additional example of how coils are wound on the electric motors according to this invention. Except the items described below, this example is the same as the example described above. In these figures, arrows put on the coil conductors of four coil groups of each phase indicate the directions of currents flowing through the respective phase coil groups at a certain instant of time.

This example is a variation of the example shown in FIGS. 7A~7C. In this example, coil conductors are wound such that the reversely wound coil groups 312, 322 and 332 as shown in FIGS. 7A~7C appear to be flipped upside down as seen in FIGS. 9A~9C, and also the directions of the currents through the reversely wound coil groups 312, 322 and 332 are reversed in contrast to the embodiment shown in FIGS. 7A~7C, so that virtual closed circuits whose currents encircle a series of teeth pairs, can be formed with the conductors of the normally wound coil groups 311, 321 and 331 and the conductors of the reversely wound coil groups 312, 322 and 332.

In this example, the total of four coil elements are inserted in each slot. Thus, this example can also be applied to the case where the number of coil elements inserted in each slot is even.

FIG. 10 schematically shows a third embodiment of an electric motor, with its air gap portion developed linearly along the circumferential direction of the rotor. Except the items described below, this embodiment is the same as the embodiments described above. The winding structure employed in this embodiment is the combination of the above described dispersed winding and the twin three-phase windings. Namely, two systems of three-phase coil groups, each system being similar to the three-phase coil groups shown in FIG. 1, are so disposed that one coil group of one system is shifted in phase from the corresponding coil group of the other system. As shown in FIG. 10, twelve (12) teeth are provided within the range of 360 electrical degrees, that is, two adjacent teeth are separated from each other by 30 electrical degrees. Coil units of dispersed winding for one three-phase system (three-phase system A) are disposed in those portions of teeth 21 which are remote from the rotor in the radial direction while coil units of dispersed winding for the other three-phase system (three-phase system B) are disposed in those portions of teeth 21 which are less remote from the rotor in the radial direction. The coil units of the three-phase system B are staggered by 30 electrical degrees from the corresponding coil units of the three-phase system A. The coil conductors of the three-phase system A and the coil conductors of the three-phase system B are connected in parallel with each other. In each of the three-phase systems A and B, each coil unit spans four teeth.

Figure 11:
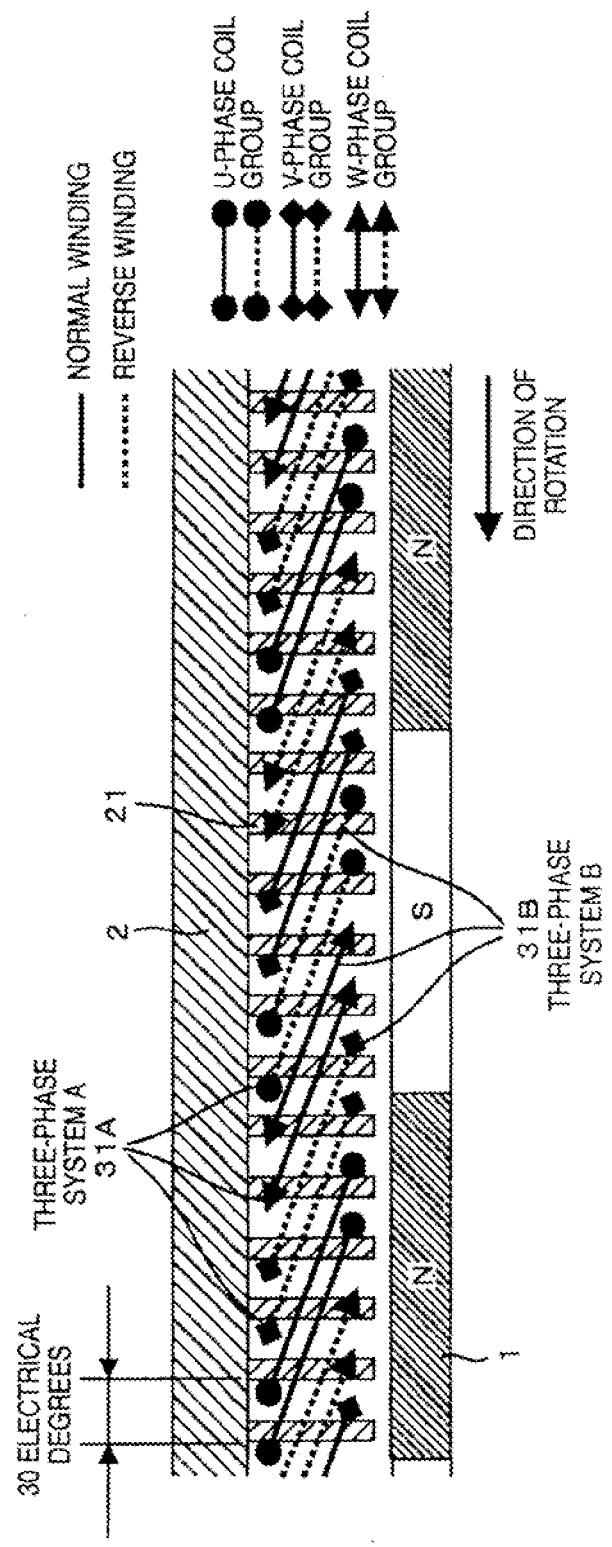
FIG. 11 schematically shows a fourth embodiment of an electric motor, with its air gap portion developed linearly along the circumferential direction of the rotor.

FIG. 11 schematically shows a fourth embodiment of an electric motor, with its air gap portion developed linearly along the circumferential direction of the rotor. Except the items described below, this embodiment is the same as the embodiments described above.

It is preferable to construct the windings of the three-phase system A and the windings of the three-phase system B equivalently in the sense of electric circuit element. By doing so, the higher harmonic components of electromagnetic force can be effectively suppressed. When this winding structure is employed in a generator, the output current becomes uniform so that the ripples in the resultant output current can be reduced. To obtain this effect, each coil unit spanning teeth in the circumferential direction is slanted as viewed in the direction along the rotor shaft, as shown in FIG. 11. Thus, the windings of each of the three-phase systems A and B form stator magnetic poles for the respective phases U, V and W. Two coil units of a phase, separated by 30 electrical degrees from each other, have their one coil side disposed in that portion of a slot which is remote from the rotor and their other coil side disposed in that portion of another slot which is less remote from the rotor, so that the coil ends of the two coil units may not cross each other. With this winding structure, the two three-phase systems A and B will have equal electric circuit characteristics.

Figure 12:
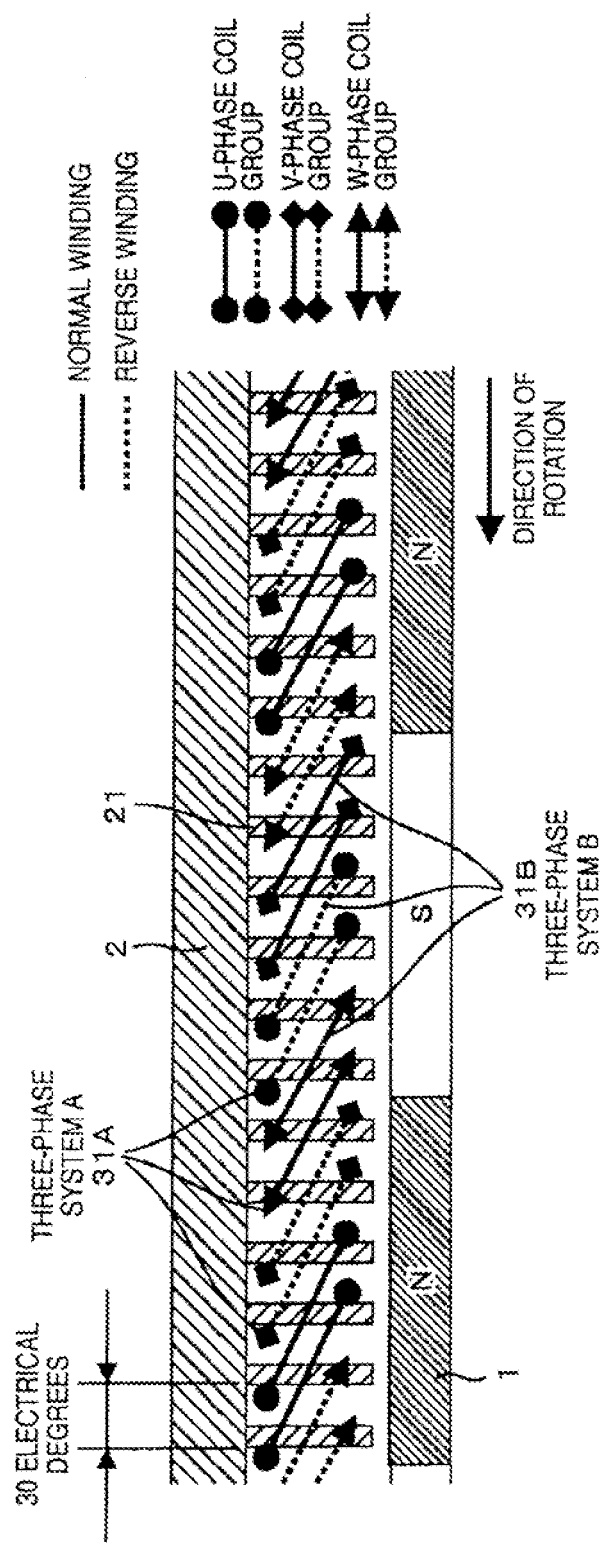
FIG. 12 schematically shows a variation of the electric motor shown in FIG. 11.
Figure 13:
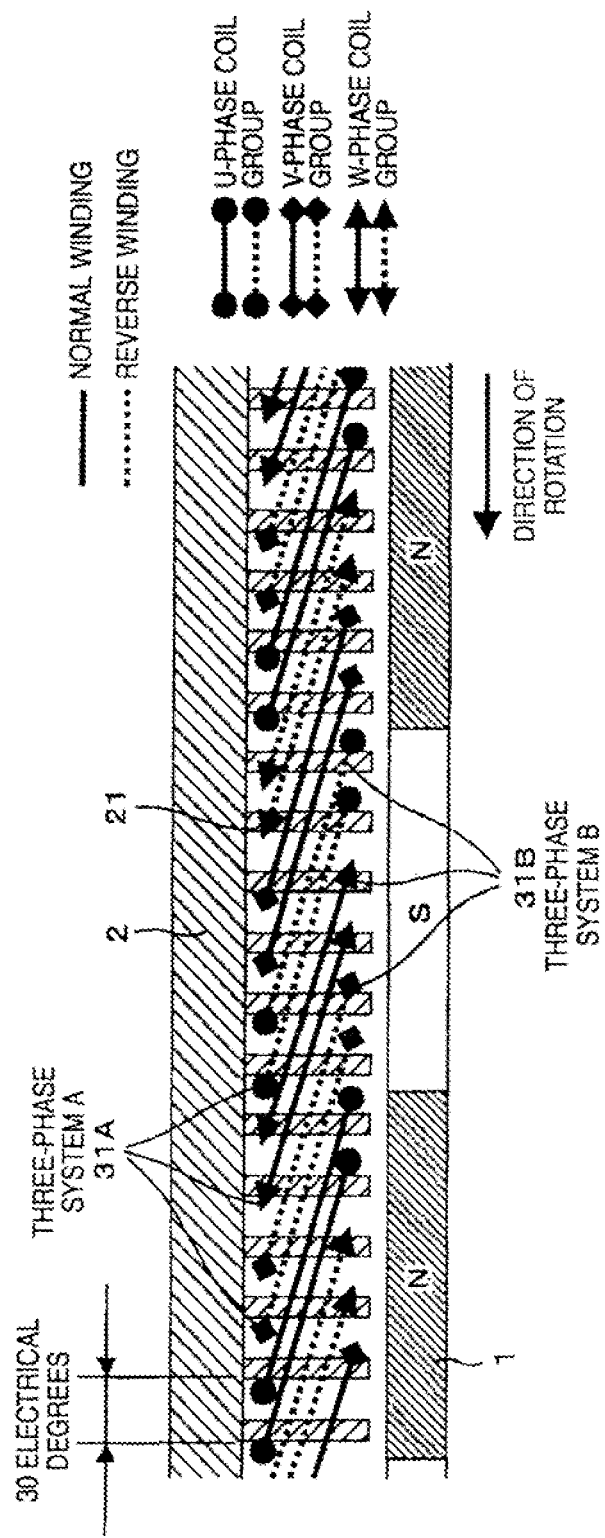
FIG. 13 schematically shows another variation of the electric motor shown in FIG. 11.

In the embodiment shown in FIG. 11, each coil unit spans four teeth, i.e. 120 electrical degrees, but each coil unit may span three teeth, i.e. 90 electrical degrees, as shown in FIG. 12. Further, each coil unit may span five teeth, i.e. 150 electrical degrees, as shown in FIG. 13.

If the twin three-phase systems of dispersed winding are employed and the two three-phase systems are staggered by 30 electrical degrees or so from each other, then the sixth harmonic component of electromagnetic force can be effectively suppressed so that the electric rotating machine using this winding structure can reduce acoustic noise during operation to a great extent.

Figure 14:
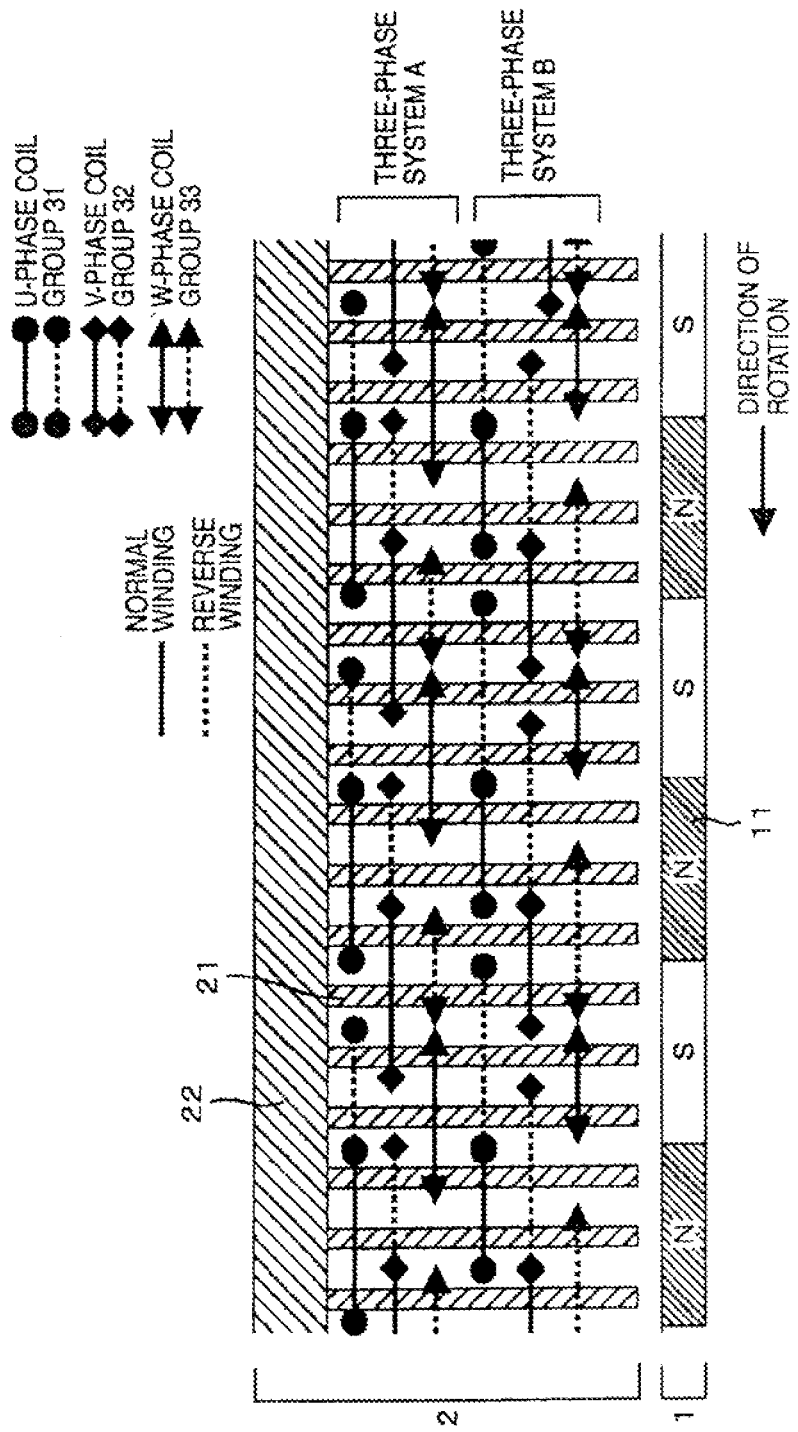
FIG. 14 schematically shows a fifth embodiment of an electric motor, with its air gap portion developed linearly along the circumferential direction of the rotor.

FIG. 14 schematically shows a fifth embodiment of an electric motor, with its air gap portion developed linearly along the circumferential direction of the rotor. Except the items described below, this embodiment is the same as the embodiments described above.

Figure 15A:
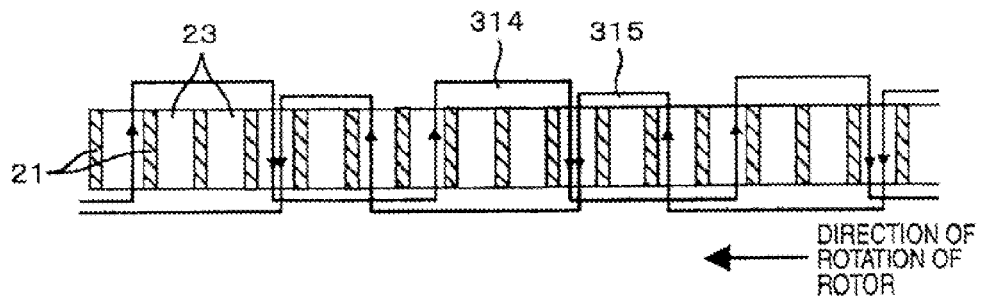
FIGS. 15A and 15B show the U-phase windings on the electric motor shown in FIG. 14.
Figure 15B:
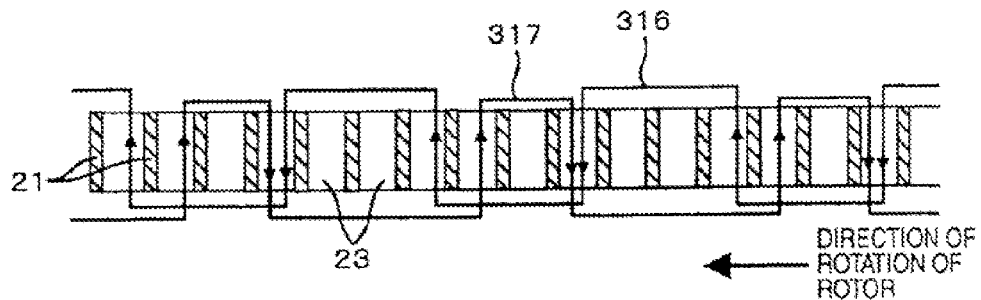
Figure 16:
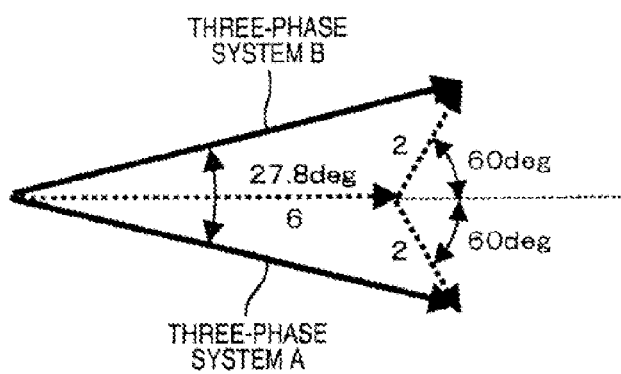
FIG. 16 is the phaser diagram associated with the windings shown in FIGS. 15A and 15B.

In the embodiment shown in FIG. 11, six teeth were provided for each magnetic pole of the rotor to be fit for the twin three-phase winding structure. However, this embodiment employs the structure in which three teeth are provided per magnetic pole of the rotor, to realize the twin three-phase winding structure. In this embodiment, the basic dispersed winding structure is partially changed. As shown in FIG. 14, each normally wound coil unit in the U-phase coil group of the three-phase system A spans three teeth while each reversely wound coil unit in the U-phase coil group of the three-phase system A spans two teeth. On the other hand, each normally wound coil unit in the U-phase coil group of the three-phase system B spans two teeth while each reversely wound coil unit in the U-phase coil group of the three-phase system B spans three teeth. One coil side of each normally wound coil unit and one coil side of each reversely wound coil unit share the same slot, and the positions of such shared slots are the same for both the three-phase system A and the three-phase system B. FIGS. 15A and 15B show how the coil conductor is wound around the stator teeth with respect to the U-phase coil groups for both the three-phase system A and the three-phase system B. A normally wound coil group 314 and a reversely wound coil group 315 of the three-phase system A, and a normally wound coil group 317 and a reversely wound coil group 316 of the three-phase system B, are all in the wave winding as shown in FIGS. 15A and 15B, respectively. The number of the conductor turns of each normally wound coil unit is the same as that of each reversely wound coil unit. FIG. 16 is the phaser diagram associated with the U-phase windings of the three-phase systems A and B shown in FIGS. 15A and 15B, the phaser diagram denoting the magnetic fluxes which the U-phase coil groups for both the three-phase system A and the three-phase system B cut, with their phase relationship taken into consideration. In FIG. 16, the relative magnitudes of the phasers representing the respective fluxes are given by numerals 6 and 2 when each of the normally wound coil unit and the reversely wound coil unit has two coil turns. Vector calculation indicates that 27.8 degrees is the difference in electrical angle between the phasers representing the magnetic fluxes which the U-phase coil groups for the three-phase systems A and B cut, respectively. Although the difference angle is a bit shifted from 30 degrees, the rate of reduction, in this case, in the sixth harmonic component of electromagnetic vibrating force is given by the expression:

(1+cos(6×27.8 deg))/2=0.013 or 1.3%

This value means that a sufficient effect of noise reduction has been obtained, that is, acoustic noise during operation can be suppressed. According to this embodiment, the number of teeth spun by the normally wound coil unit is different from the number of teeth spun by the reversely wound coil unit, in the U-, V- and W-phase coil groups for each of the three-phase systems A and B. This embodiment has an advantage that coil winding work is facilitated since the number of teeth spun by each coil unit need not be doubled.

If the phase difference angle in the twin three-phase system is 20 degrees, it holds that (1+cos(6×20 deg))/2=0.25

If the phase difference angle in the twin three-phase system is 40 degrees, it holds that (1+cos(6×40 deg))/2=0.25

Thus, both cases give the same result, that is, the reduction rate of 25% for the sixth harmonic component of electromagnetic vibrating force. Accordingly, if the difference angle is set within a range of 20~40 degrees, the reduction rate for the sixth harmonic component of electromagnetic vibrating force can be rendered equal or less than 25%.

Figure 17:
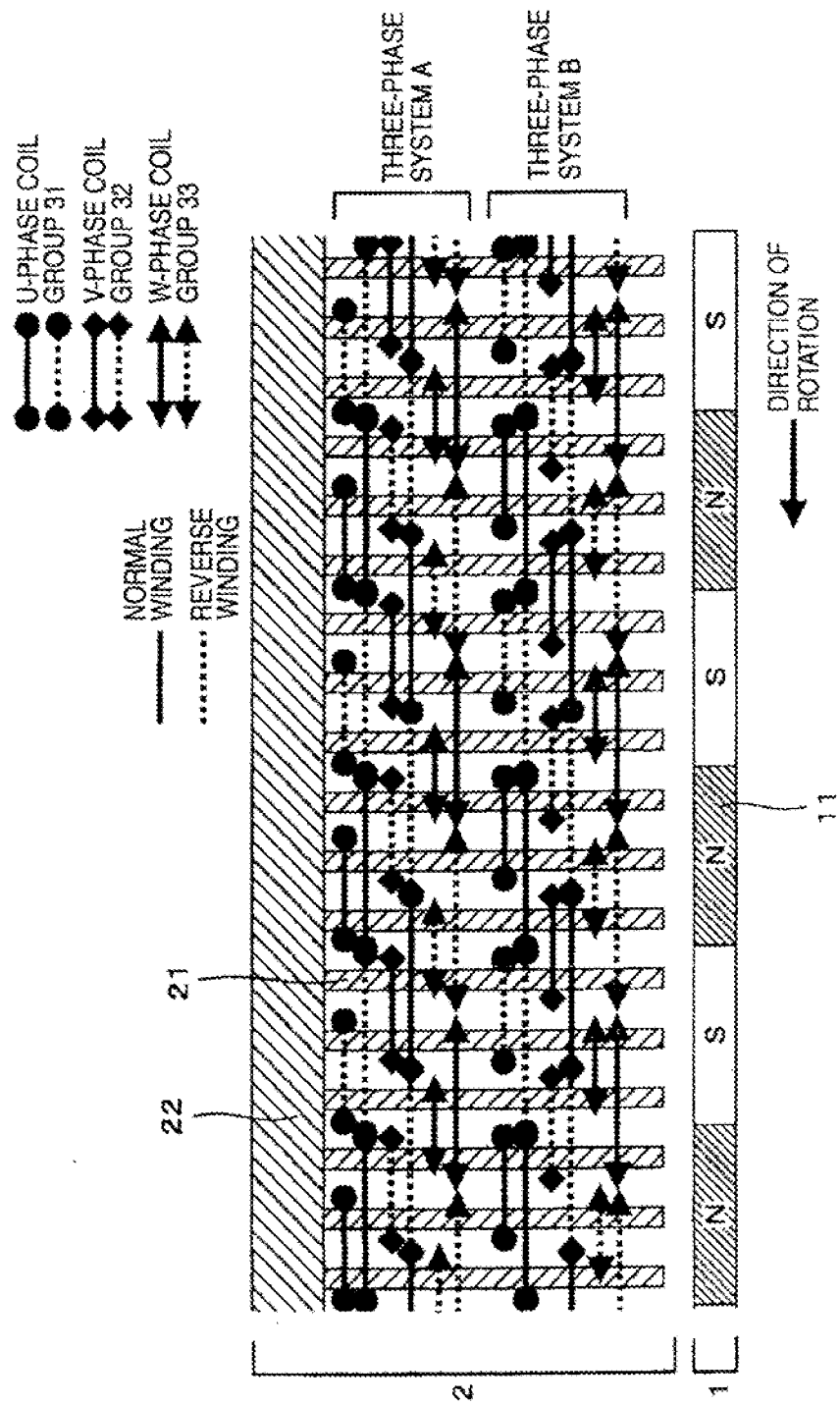
FIG. 17 schematically shows a sixth embodiment of an electric motor, with its air gap portion developed linearly along the circumferential direction of the rotor.
Figure 18A:
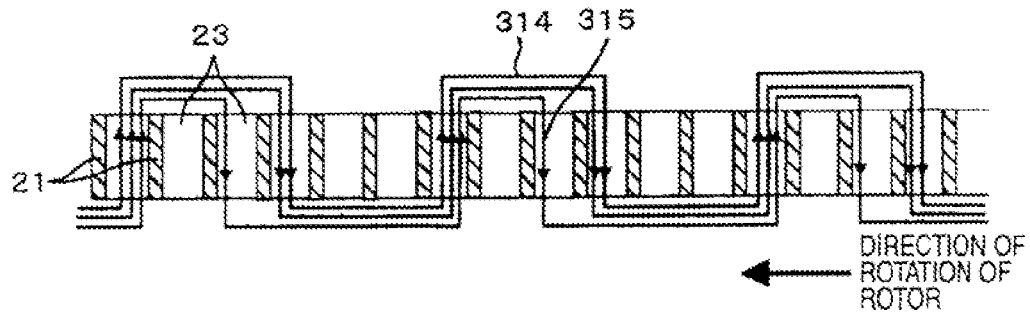
FIGS. 18A and 18B show the U-phase windings on the electric motor shown in FIG. 17.
Figure 18B:
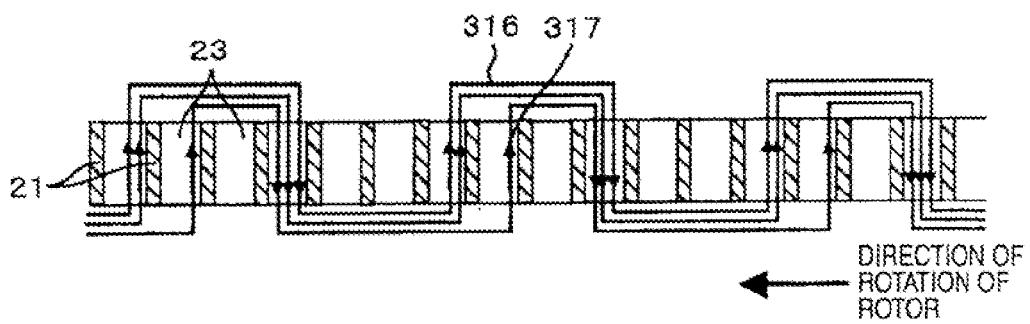
Figure 19:
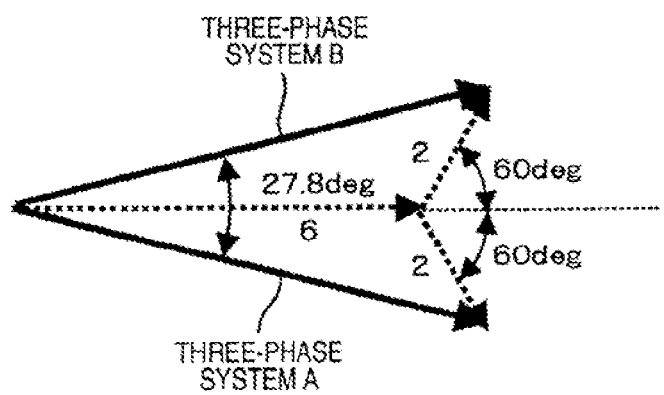
FIG. 19 is the phaser diagram associated with the windings shown in FIGS. 18A and 18B.

Another embodiment based on the same idea as described above will now be explained in reference to FIGS. 17~19. This embodiment is similar to the embodiment shown in FIG. 15, except for the addition of an auxiliary coil groups. As shown in FIGS. 18A and 18B, all the coil units are in the wave winding. In this case, too, since the same reduction rate can be obtained for the sixth harmonic component of electromagnetic vibrating force, the same effect as in the above described embodiment can be obtained.

Figure 20:
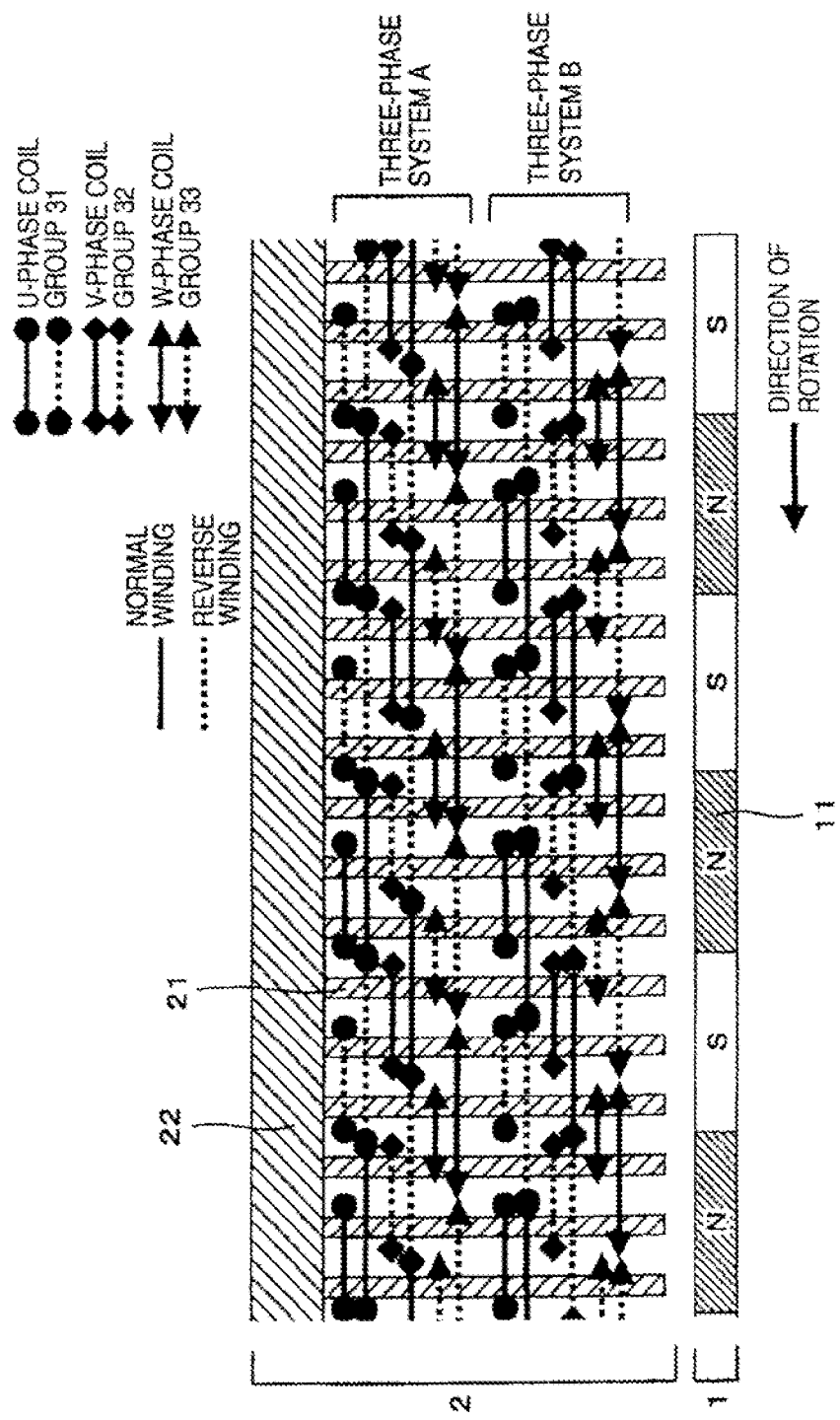
FIG. 20 schematically shows a seventh embodiment of an electric motor, with its air gap portion developed linearly along the circumferential direction of the rotor.
Figure 21A:
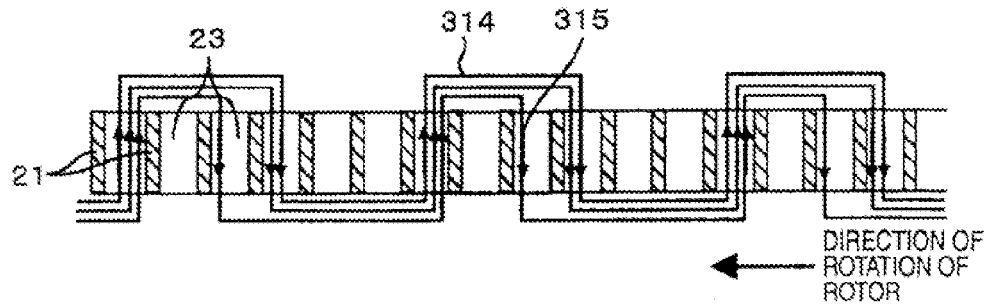
FIGS. 21A and 21B show the U-phase windings on the electric motor shown in FIG. 20.
Figure 21B:
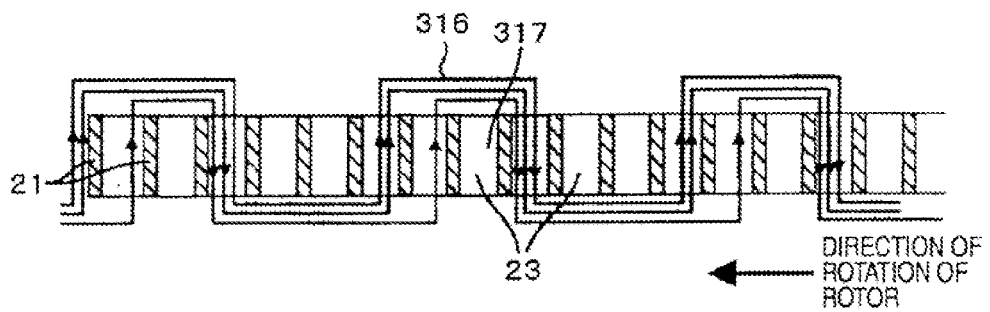
Figure 22:
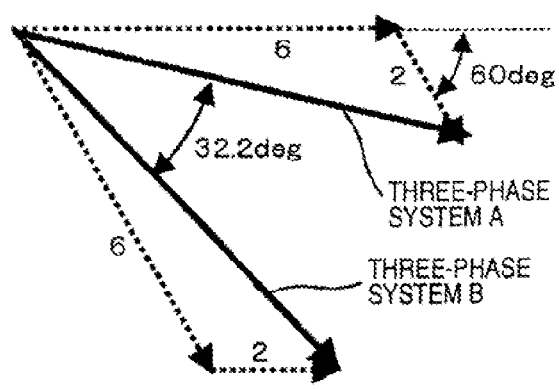
FIG. 22 is the phaser diagram associated with the windings shown in FIGS. 21A and 21B.

Still another embodiment based on the same idea as described above will be briefly explained in reference to FIGS. 20~22. This embodiment is similar to that shown in FIG. 17, except in that the three-phase system B is modified. As shown in FIGS. 21A and 21B, all the coil units are in the wave winding. In this case, the reduction rate for the sixth harmonic component of electromagnetic vibrating force can be given by (1+cos(6×32.2 deg))/2=0.013

Thus, since the same reduction rate as in the previous embodiment can be obtained for the sixth harmonic component of electromagnetic vibrating force, the same effect as in the above described embodiment can be obtained.

Figure 23:
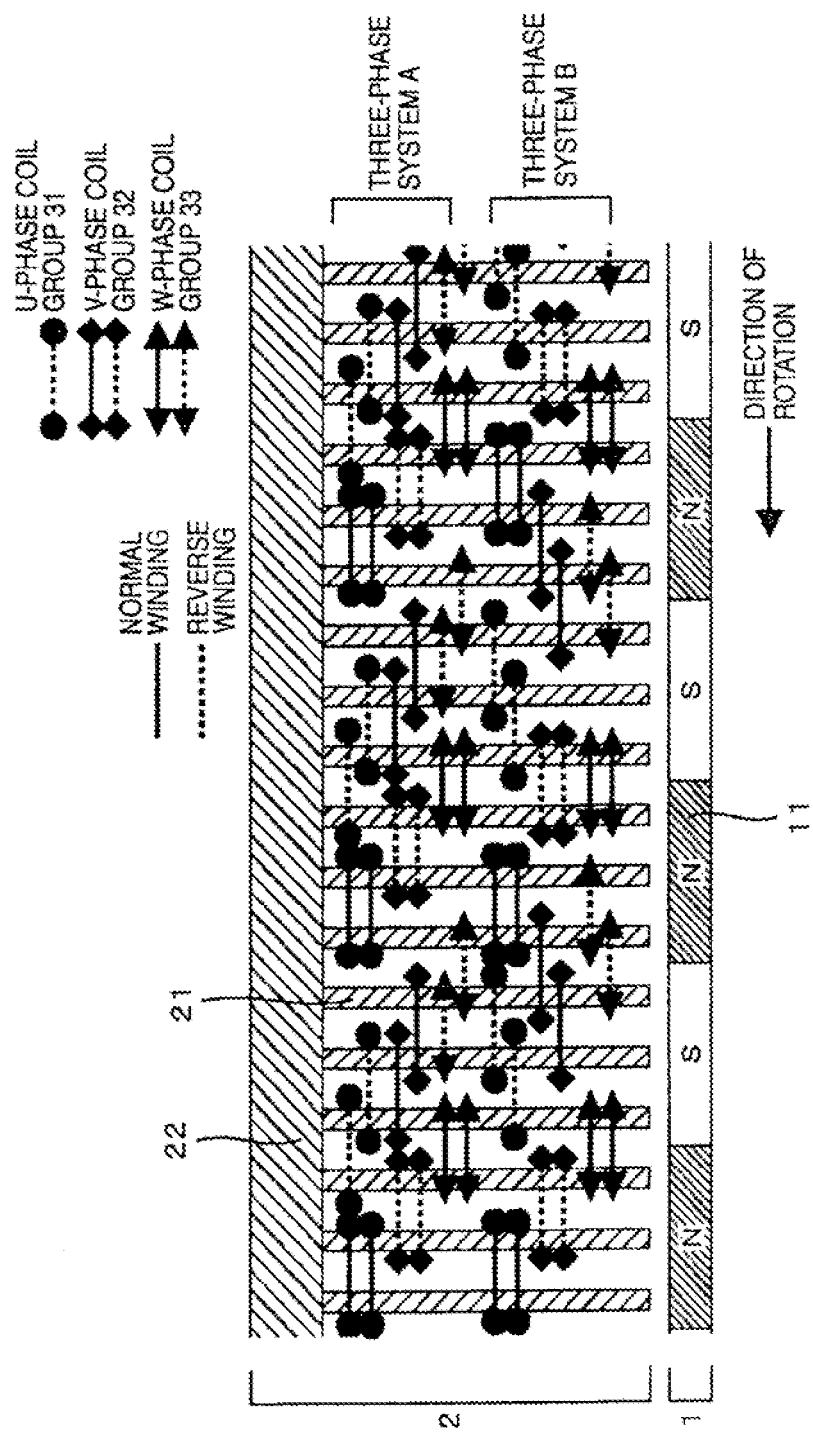
FIG. 23 schematically shows an eighth embodiment of an electric motor, with its air gap portion developed linearly along the circumferential direction of the rotor.
Figure 24A:
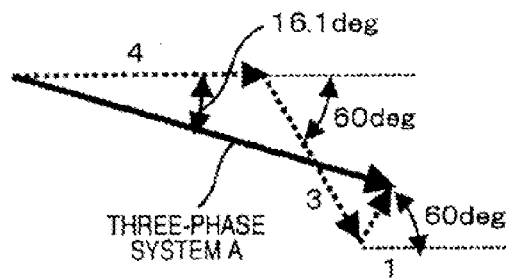
FIGS. 24A and 24B are the phaser diagrams associated respectively with the windings of three-phase systems A and B of the electric motors shown in FIG. 23.
Figure 24B:
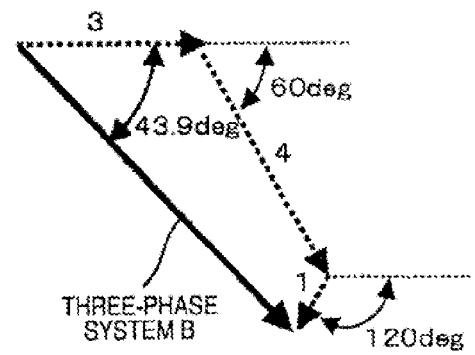

Yet another embodiment based on the same idea as described above will be briefly explained in reference to FIG. 23. According to this embodiment, the phase difference in electrical angle between the three-phase systems A and B can be made roughly equal to 30 degrees by slightly shifting the positions of the coil groups for the three-phase system A from the positions of the coil groups for the three-phase system B. The associated phaser diagrams shown in FIGS. 24A and 24B indicate that the phase difference in electrical angle between the three-phase systems A and B is 43.9−16.1=27.8 (deg). The corresponding reduction rate for the sixth harmonic component of electromagnetic vibrating force is given by (1+cos(6×27.8 deg))/2=0.013

Therefore, the same effect as in the above described embodiment can be obtained. The coil structure shown in FIG. 23 is only schematically depicted, and it will be needless to say that even if all the coil units are radially shifted in position as desired for ease of coil winding work, the sixth harmonic component of electromagnetic vibrating force can be effectively reduced.

Any of the above described embodiments can be widely used in electric motors and generators for use in power, industry, domestic and vehicle applications. To be concrete, high-rated examples include windmill generators, vehicle driving motors and industrial rotating machines; mid-rated ones include rotating machines used for industrial application and auxiliary equipment on vehicles; and low-rated ones include electric rotating machines for use in OA devices.

An embodiment in which this invention is concretized as a generator will now be described. By employing such a twin three-phase system as described above, output currents containing less ripples can be obtained.

Figure 25:
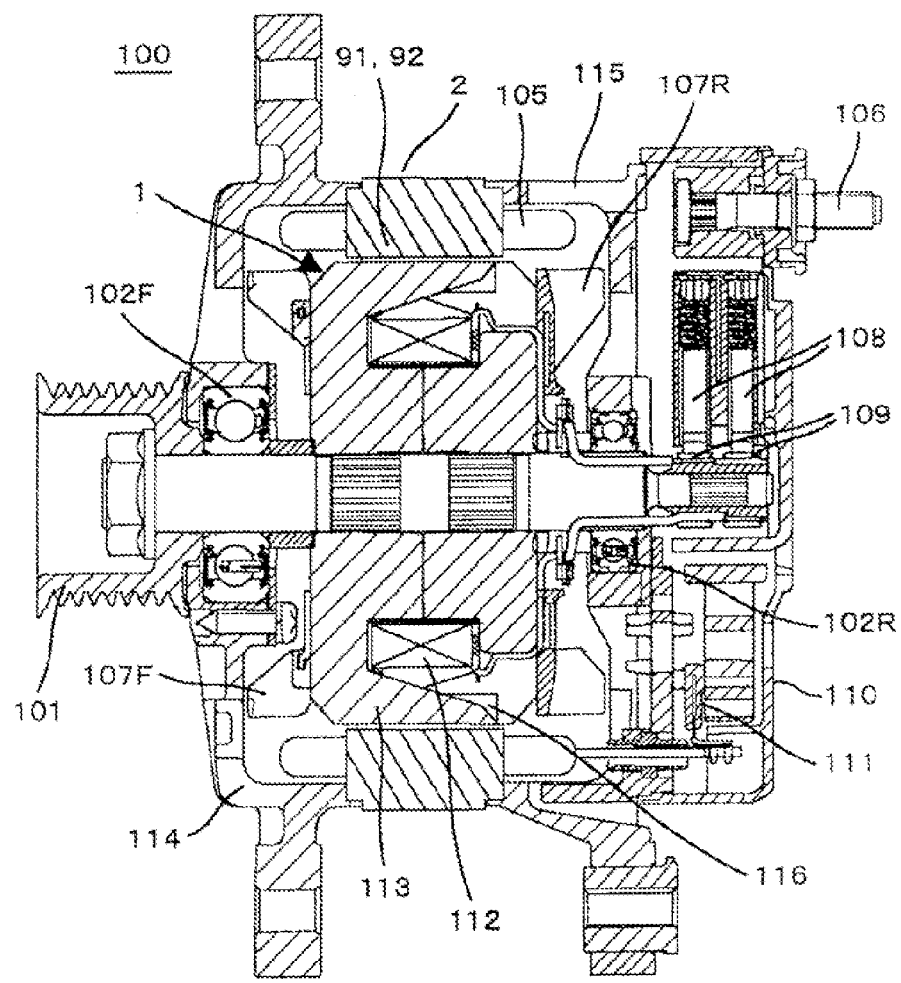
FIG. 25 shows in cross section an air-cooled alternator for use on a vehicle, as an embodiment of this invention.

FIG. 25 shows in cross section an air-cooled alternator for use on a vehicle, as an embodiment of this invention. A rotor 1 has nail-shaped magnetic poles 113 provided around a shaft, and a field winding 112 is wound around the central part of the nail-shaped magnetic poles 113. A pulley 101 is attached to one end of the shaft, and slip rings 109 for energizing the field winding are mounted on the other end of the shaft. A cooling fan system consisting of a front fan 107F and a rear fan 107R, which are rotated in synchronism with the rotor 1, is attached to the nail-shaped magnetic poles 113. The nail-shaped magnetic poles 113 are provided with permanent magnets 116 for auxiliary excitation to add to the flux generated by the field winding. A stator 2 comprises stator magnetic poles 91, 92 and a stator winding. The stator 2 is disposed opposite to the rotor 1, with a thin air gap defined between them. The stator 2 is supported by a front bracket 114 and a rear bracket 115. The shaft of the rotor 1 is rotatably supported by bearings 102F and 102R mounted on the front and rear brackets 114 and 115, respectively. The slip rings 109 are in contact with brushes 108 so as to feed power to the field winding 112 for creating rotor magnetic poles. The stator winding consists of three-phase coil groups as described with the foregoing embodiments. The coil ends of the respective coil groups are connected to a rectifying circuit 111. The rectifying circuit 111 comprises rectifying elements such as diodes and is wired in full-wave rectifier configuration. In the case where diodes are used as rectifying elements, their cathode terminals are connected to a terminal 106 while their anode terminals are electrically connected to the casing of the in-vehicle alternator 100. A rear cover 110 serves as a protective casing for the rectifying circuit 111.

Now, the operation of generating power will be described. An engine (not shown) is mechanically coupled to the in-vehicle alternator 100 via a belt. The in-vehicle alternator 100 is coupled to the engine via the pulley 101 and the belt, and when the engine revolves, the rotor 1 also revolves. By passing current through the field winding 112 provided in the central portion of the nail-shaped magnetic poles 113 of the rotor 1, the nail-shaped magnetic poles 113 are magnetized so that the revolution of the rotor 1 causes three-phase voltages to be induced across the stator windings. These voltages are full-wave rectified by the rectifying circuit 111 to output a DC voltage. The positive side of this DC voltage is connected with the terminal 106 and further with a battery (not shown). The exciting current through the field winding is so controlled as to make the amplitude of the DC voltage fit for charging the battery though the details of the control mechanism is omitted here.

Figure 26A:
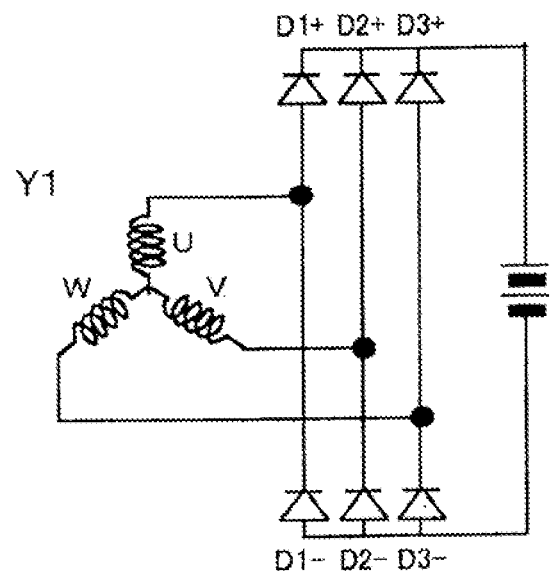
FIGS. 26A and 26B show two examples of three-phase rectifier circuits for the three-phase windings on the alternator shown in FIG. 25.
Figure 26B:
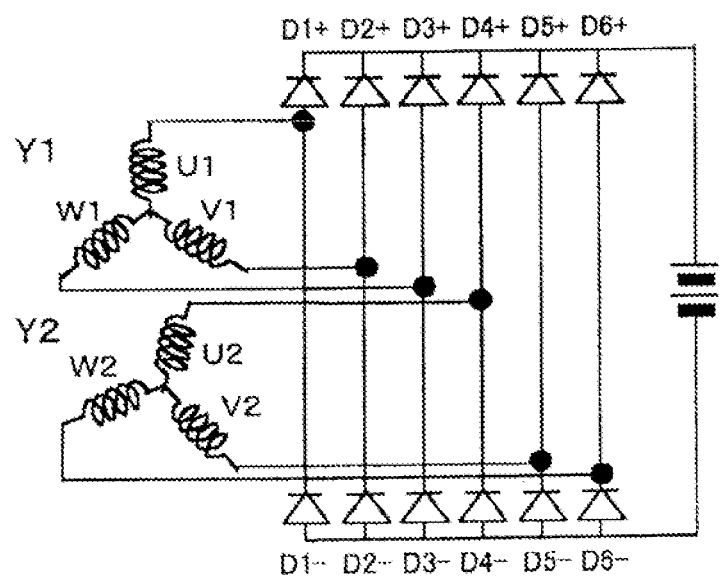

FIGS. 26A and 26B show examples of three-phase rectifier circuits for the three-phase windings on the alternator shown in FIG. 25. FIG. 26A corresponds to the three-phase rectifying circuit adapted to the embodiments shown in FIGS. 1~9 while FIG. 26B corresponds to the three-phase rectifying circuit adapted to the embodiments shown in FIG. 10 and the flowing figures. The windings for the respective phases are configured in three-phase star (or Y) connection. As shown in FIG. 26A, the non-neutral terminals of the star-connected three-phase windings are connected with six diodes D1+~D3−. The cathodes of the positive side diodes D1+~D3+ are connected in common with the positive terminal of the battery. The anodes of the negative side diodes D1−~D3− are connected in common with the negative terminal of the battery.

In the rectifying circuit shown in FIG. 26B, the U1 winding of the three-phase system Y1 is electrically independent from the U2 winding of the three-phase system Y2, and the U1 and U2 windings develop across them the voltages whose amplitudes are equal to each other but whose phases are shifted by 30 electrical degrees from each other. Accordingly, the higher portions of both the voltages are selected as a result of rectification so that the rectified DC current includes ripples whose half period is 30 electrical degrees.

In this embodiment, the star-connected windings are employed. However, the delta-connected windings may also be employed. With the delta-connected windings, the induced voltages can be increased by 11.5% as compared with the voltages induced in the star-connected windings.

Some of the above described embodiments relate to an electric rotating machine comprising a stator consisting of stator coil groups through which three-phase currents in a single three-phase system flow, stator teeth around which the stator coil units are wound, and core packs via which magnetic flux flowing through the stator teeth is circulated; and a rotor having magnetic poles disposed opposite to the stator teeth, wherein only U- and V-phase coil units, only V- and W-phase coil units, or only W- and U-phase coil units are wound around a particular stator tooth.

Others of the above described embodiments relate to an electric rotating machine comprising a stator consisting of stator coil groups through which three-phase currents in a single three-phase system flow, stator teeth around which the stator coil units are wound, and core packs via which magnetic flux flowing through the stator teeth is circulated; and a stator having magnetic poles disposed opposite to the stator teeth, wherein the normally wound coil units in concentrated winding configuration for the U-, V- and W-phase coil groups are inserted in the radially outer portions of the stator slots; the reversely wound coil units in concentrated winding configuration for the U-, V- and W-phase coil groups are inserted in the radially inner portions of the stator slots; and the coil groups of each phase are connected in series with one another.

The rest of the above described embodiments relate to an electric rotating machine comprising two three-phase systems, each system having the U-, V- and W-phase coil groups, wherein the phase difference in electrical angle between the two three-phase systems is made roughly equal to 30 degrees or falls within a range of 20~40 electrical degrees.

Figure 28A:
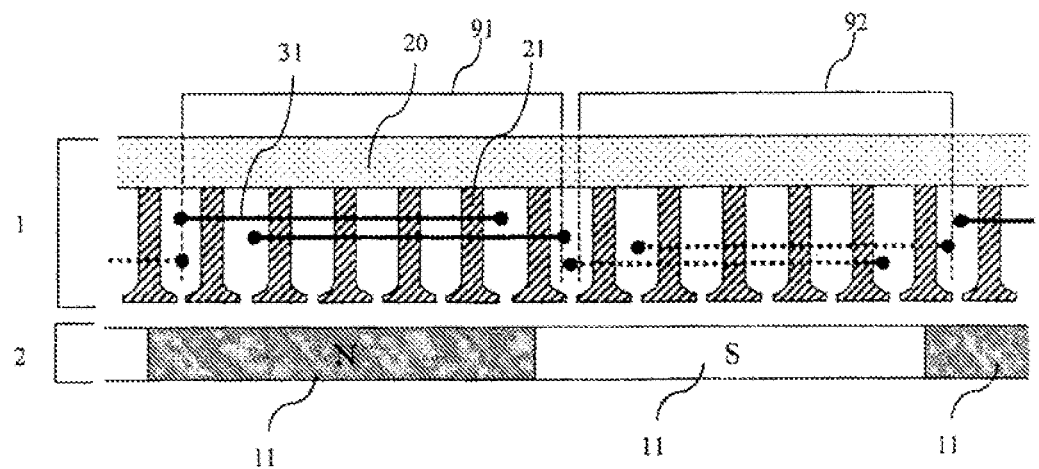
FIGS. 28A and 28B schematically show the two different aspects of a ninth embodiment of an electric motor, illustrating how coils are wound around the stator teeth.
Figure 28B:
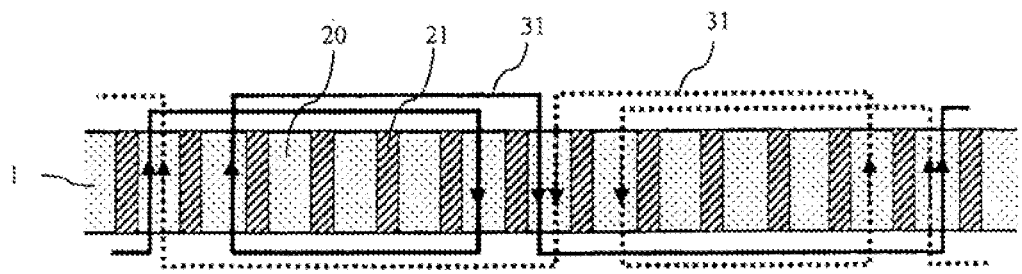

FIGS. 28A and 28B schematically show the two different aspects of a ninth embodiment of an electric motor, with its air gap portion developed linearly, illustrating how coils are wound around the stator teeth. FIG. 28A is a view as seen in the direction along the rotary shaft of the rotor and FIG. 28B is a view as seen in the radial direction from rotor to the stator. Except the items described below, this embodiment is similar to the preceding embodiments. As shown in FIG. 28A, the electric motor mainly comprises a rotor 1 and a stator 2. The rotor 1 is provided with plural rotor magnetic poles 11, and the stator 2 is provided with plural stator teeth 21 to form stator magnetic poles. Each of the coil units of the three-phase coil groups spans plural teeth 21. Although only the coil units 31 of the U-phase coil group are shown in FIGS. 28A and 28B, it should be understood that the layout of the coil units is such that both the V-phase coil units and the W-phase coil units are staggered in lagging phase from the U-phase coil units by 120 electrical degrees along the circumferential direction of rotor. Since the stator teeth 21 are disposed at a regular interval of 30 electrical degrees, the V-phase coil units and the W-phase coil units are staggered behind from the U-phase coil units by a distance of four teeth. It is defined here that the V-phase coil units are the coil units through which flows an alternating current whose phases lag by 120 degrees (or leads by 240 degrees) from the alternating current flowing through the U-phase coil units, and that the W-phase coil units are the coil units through which flows an alternating currents whose phases lag by 240 degrees (or leads by 120 degrees) from the alternating current flowing through the U-phase coil units.

It is noted here that solid line indicates coil units of normal winding (in which the coil conductor is wound around teeth clockwise as viewed radially from the rotor toward the stator), whereas broken line denotes coil units of reverse winding (in which the coil conductor is wound around teeth counterclockwise as viewed radially from the rotor toward the stator). As shown in FIGS. 28A and 28B, the coil units of normal winding are placed in the slots of the stator 2 remotely from the rotor 1, but they may be placed closer to the rotor 1 in the slots. As shown in FIGS. 28A and 28B, two U-phase coil units of concentrated winding, each having two turns and wound in the normal direction, are staggered from each other by 180 electrical degrees, and connected in series with each other. Another similar U-phase coil units of concentrated winding, having two turns but wound in the reverse direction, are disposed between the adjacent normally wound coil units separated by 180 electrical degrees from each other. The teeth of the stator 2 are disposed opposite to the magnetic poles of the rotor 1, with an air gap between them. Each normally wound coil unit spans six teeth 21 in general, to form a stator magnetic pole 91 while each reversely wound coil unit spans six teeth 21 in general, to form another stator magnetic pole 92. In each of such coil units, one of the two turns spans six teeth in full (i.e. 180 electrical degrees) while the other turn spans less teeth (i.e. less than 180 electrical degrees). To be concrete, the other turn spans four teeth 21. If each coil unit has more than two turns, more than one turn may span four teeth. In the electric motor according to this embodiment, the coil conductors are so wound that the coil turns forming the stator magnetic pole 91 may not overlap the coil turns forming the stator magnetic pole 92 and that the stator magnetic poles 91 and 92 may exhibit opposite magnetic polarities with respect to each other.

Here, the coil turns (or coil units) forming the two stator magnetic poles 91 and 92 are staggered by 180 electrical degrees from each other. The repetition of the layout of these coil units constitutes each of the U-, V- and W-phase coil groups, these three-phase coil groups being staggered by 60 electrical degrees from one another. The V- and W-phase coil groups are not shown in FIGS. 28A and 28B.

Each coil unit of the V-phase coil group is staggered by two teeth from and wound in the reverse direction with respect to, each coil unit of the U-phase coil group. Since +60 degrees− 180 degrees=−120 degrees, the V-phase coil group lags in phase behind the U-phase coil group by 120 electrical degrees. Since each coil unit of the W-phase coil group is staggered by four teeth from and wound in the same direction with respect to, each coil unit of the U-phase coil group, the W-phase coil group leads in phase the U-phase coil group by 120 electrical degrees (i.e. 2×60 electrical degrees).

As compared with the conventional concentrated winding structure where a single concentrated winding is provided within a range of 360 electrical degrees, the area of the coil turn circuit cutting the magnetic flux generated by the rotor, according to the stator winding structure of this embodiment, is doubled so that the coil utility factor is also doubled. In order to obtain the same flux linkage, the number of coil turns around, for example, a particular stator magnetic pole can be halved as compared with the number of corresponding coil turns in the conventional concentrated winding structure. The coil units of the U-, V- and W-phase coil groups are dispersed over the range of electrical angles that is twice as wide as that for the conventional concentrated winding structure. Moreover, according to this embodiment, different from the way of winding coil conductor in the conventional concentrated winding structure where all the turns of any coil unit are wound around the same number of teeth, all but one of the plural turns of any coil unit are wound around ⅔ of the entire teeth forming one stator magnetic pole while the one remaining turn is wound around the rest (⅓) of the entire teeth. This winding structure can reduce the overall coil inductance as compared with the conventional concentrated or distributed winding structure.

The coil units of the U-, V- and W-phase coil groups are dispersed over the range of electrical angles that is twice as wide as that for the conventional concentrated winding structure, and also overlap one another by about half of coil span. Accordingly, the armature reaction is relatively smoothly distributed along circumferential direction as compared with the conventional concentrated winding structure, so that the higher harmonic components of electromagnetic force can be reduced. Thus, electric motord using this embodiment will operate with less operating noise as compared with electric motors using the conventional concentrated winding structure.

In the embodiment shown in FIGS. 28A and 28B, the stator teeth are separated from one another by 30 electrical degrees and the multiple turns of each coil unit span four stator teeth. The same effect, however, can be obtained if the multiple turns span two, three or five stator teeth.

Figure 29A:
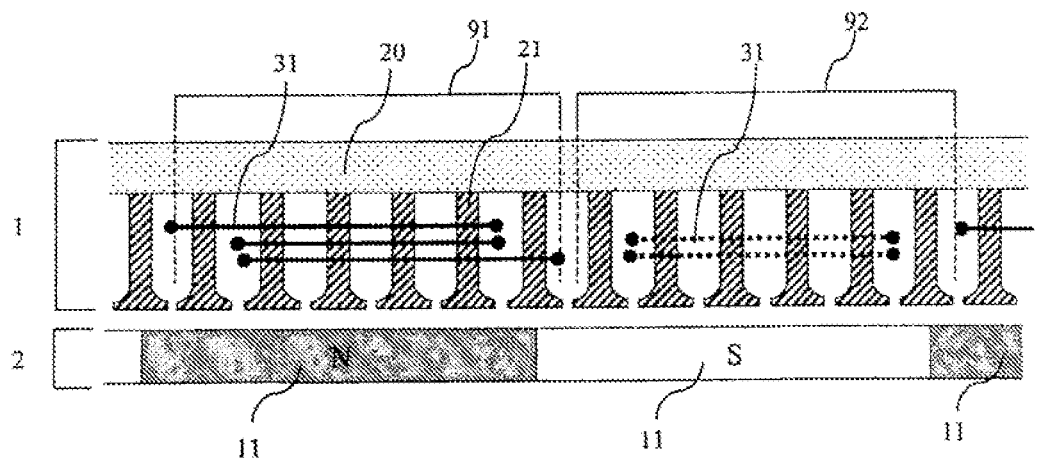
FIGS. 29A and 29B schematically show in two different aspects a tenth embodiment of an electric motor, illustrating how coils are wound around the stator teeth.
Figure 29B:
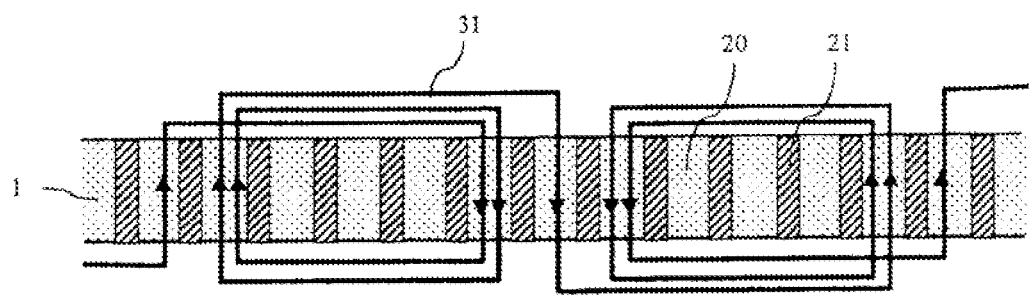

Another embodiment will be described next. In the embodiment shown in FIGS. 28A and 28B, an even number of coil turns are wound around stator teeth within the range of 360 electrical degrees, but an odd number of coil turns are wound around stator teeth within the range of 360 electrical degrees in this embodiment shown in FIGS. 29A and 29B. Except the items described below, this embodiment is similar to the previous embodiment. The stator coils in this embodiment are differently wound as compared with those in the embodiment shown in FIGS. 28A and 28B. In the embodiment shown in FIGS. 28A and 28B, for each phase, normally wound coil units and reversely wound coil units are alternately disposed in the circumferential direction; the normally wound coil units are connected in series with one another to form a normally wound coil group while the reversely wound coil units are connected in series with one another to form a reversely wound coil group; and the normally wound coil group and the reversely wound coil group are connected in series with each other at their coil ends. In this embodiment, however, for each phase, normally wound coil units and reversely wound coil units are alternately disposed in the circumferential direction and these coil units are connected in series with one another to form a so-called alternately flipped-wound coil group. In the embodiment shown in FIGS. 28A and 28B, since the normally wound coil units are connected in series with one another while the reversely wound coil units are connected in series with one another, useless coil end portions appear at an interval of 180 electrical degrees. On the other hand, in this embodiment, normally wound coil units and reversely wound coil units are connected alternately in series with one another so that no useless coil end portions are formed, with the result that coil utility factor is greater in this embodiment than in the first embodiment of this invention.

The winding structure in which the respective phase coil groups are evenly distributed in the stator slots in the radial direction, is very preferable in configuring a uniform three-phase AC system.

Figure 30A:
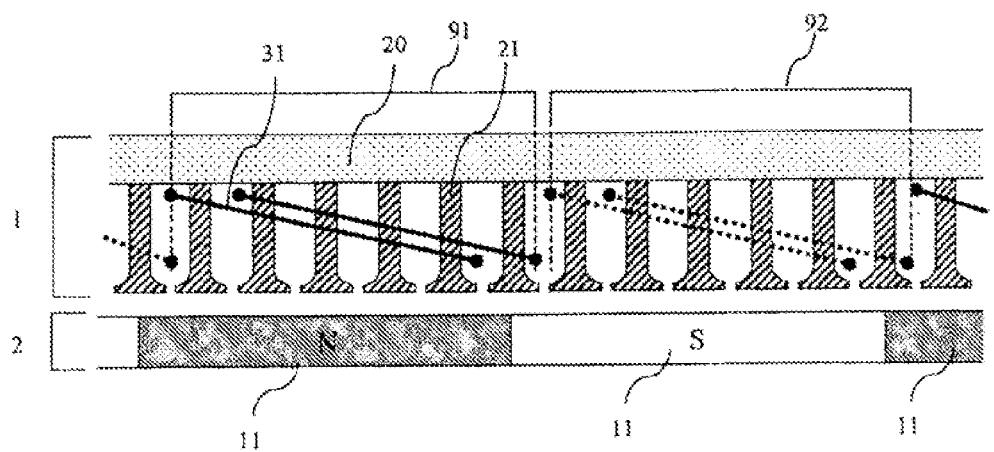
FIGS. 30A and 30B schematically show in two different aspects an eleventh embodiment of an electric motor, illustrating how coils are wound around the stator teeth.
Figure 30B:
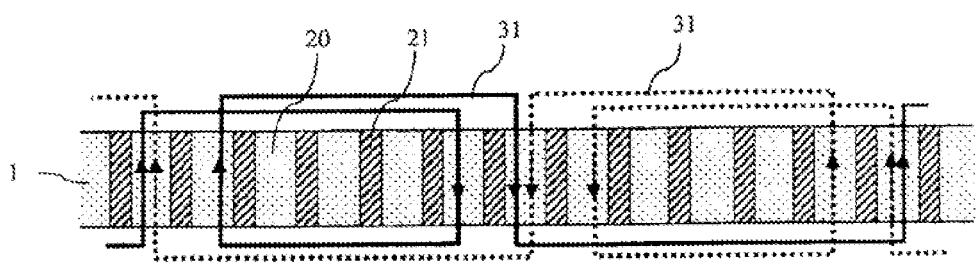
Figure 31A:
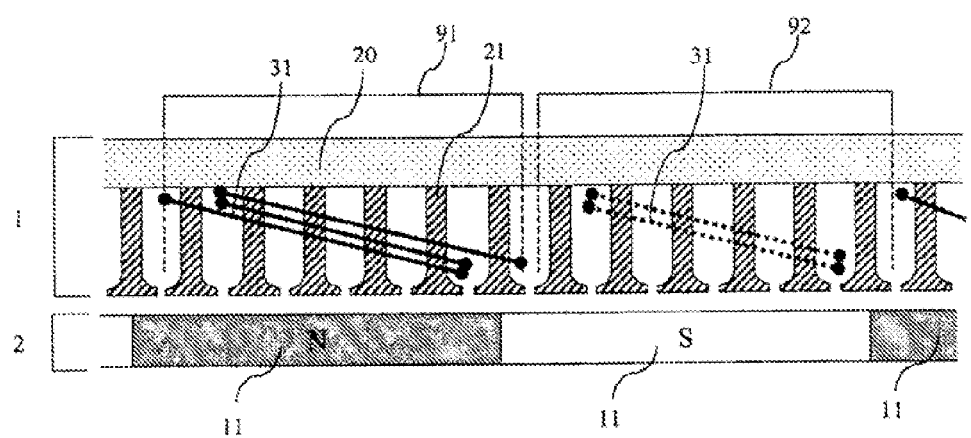
FIGS. 31A and 31B schematically show in two different aspects a twelfth embodiment of an electric motor, illustrating how coils are wound around the stator teeth.
Figure 31B:
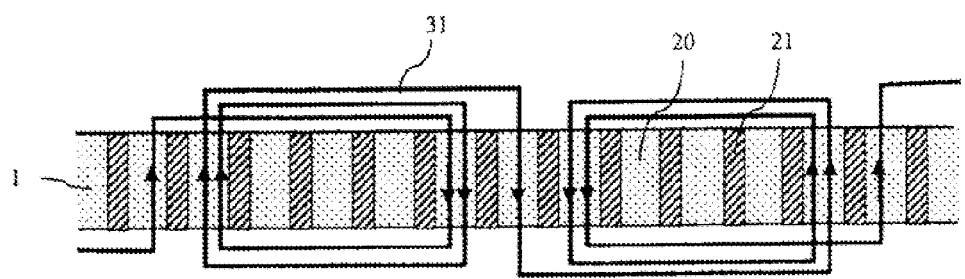

FIGS. 30A and 30B schematically show in two different aspects an eleventh embodiment of an electric motor and FIGS. 31A and 31B schematically show in two different aspects a twelfth embodiment of an electric motor, illustrating how coils are wound around the stator teeth so that the U-, V- and W-phase coil groups may be electrically uniformly distributed in the stator core along the circumferential direction. Since one coil side of each coil turn is inserted in the deeper position in a slot than the other coil side of the same coil turn, the distribution in the radial direction of the coil conductors of the respective phase coil groups becomes uniform so that the coil inductance distributed along the circumferential direction also becomes uniform.

The last four embodiments described above relate to a single three-phase system, but twin three-phase system having two systems of coil groups staggered in phase by about 30 degrees from each other will be preferably employed in order to reduce mechanical noise due to the higher harmonic components of electromagnetic force. The phase shift θ is such that 20 degrees<θ<30 degrees. The twin system consist of a first three-phase coil groups of U-, V- and W-phases and a second three-phase coil groups of U'-, V'- and W'-phases. The U'-phase coil group lags in phase the U-phase coil group by θ electrical degrees, the V'-phase coil group lags in phase the V-phase coil group by θ electrical degrees, and the W'-phase coil group lags in phase the W-phase coil group by θ electrical degrees. To be concrete, with the aid of the embodiments shown in FIGS. 28A through 31B, let the stator coil unit indicated at reference numeral 31 in FIGS. 28A through 31B be assumed to be the U-phase coil unit. Then, the U'-phase coil unit, similarly wound, is shifter to the right of the U-phase coil unit by one stator tooth; the V-phase coil unit, similarly wound, is shifted to the right of the U'-phase coil unit by three teeth; the V'-phase coil unit, similarly wound, is shifted to the right of the V-phase coil unit by one tooth; the W-phase coil unit, similarly wound, is shifted to the right of the V'-phase coil unit by three teeth; and the W'-phase coil unit, similarly wound, is shifted to the right of the W-phase coil unit by one tooth. As a result, twin three-phase coil system is completed.

One of the above described embodiments provides an electric motor comprising a rotor having plural magnetic poles along its periphery and a stator whose teeth are disposed opposite to the periphery of the rotor, wherein the coil conductors are wound on the stator so that two stator magnetic poles may be formed by two coil units of a phase wound around stator teeth within a range of 360 electrical degrees subtended by the magnetic poles of the rotor; each of the two coil units forming the stator magnetic poles spans an electrical angle equal to or less than 180 electrical degrees; each coil unit has multiple turns within a range narrower than 180 electrical degrees; the coil turns of the two coil units forming the two stator magnetic poles are laid out such that they may not overlap each other; and the coil conductors are so wound that the adjacent stator magnetic poles exhibit opposite magnetic polarities.

Another embodiment preferably provides an electric motor wherein two coil units forming two adjacent stator magnetic poles are staggered by 180 electrical degrees from each other.

Another embodiment preferably provides an electric motor wherein the stator winding consists of three-phase coil groups forming three-phase magnetic poles, one phase coil group being staggered by 120 electrical degrees from another.

Another embodiment preferably provides an electric motor wherein each coil unit of each phase coil group, having plural turns, inserted in the stator slots spans 90, 120 or 150 electrical degrees in the circumferential direction.

Another embodiment preferably provides an electric motor wherein one coil side of each coil unit is inserted in a slot remotely from the rotor while the other coil side of the same coil unit is inserted in another slot, close to the rotor.

Another embodiment preferably provides an electric motor wherein the coil conductors are so wound on the stator that two magnetic poles of a phase, formed by two coil units of the same phase, each having two or two and a half turns, are disposed within a range of 360 electrical degrees subtended by the magnetic poles of the rotor.

Another embodiment preferably provides an electric motor wherein the coil conductor is wound such that each of the coil units of each phase coil group spans 180 electrical degrees to form a stator magnetic pole for one of the three-phases; after being wound around the teeth forming the stator magnetic pole of a phase, the coil conductor then leaves the slot where it was last inserted; and after leaving the last inserted slot, the coil conductor is then inserted in a slot that is distanced by 180 electrical degrees from the last inserted slot, and starts being wound in the opposite direction with respect to the direction of winding the coil conductor around the above mentioned stator magnetic pole, to form another stator magnetic pole of the same phase.

Another embodiment preferably provides an electric motor wherein the coil conductor is wound such that each of the coil units of each phase coil group has its number of turns equal to an integer plus half unity, and spans 180 electrical degrees to form a stator magnetic pole for one of the three phases; after being wound around the teeth forming the stator magnetic pole, the coil conductor then leaves the slot where it was last inserted; and after leaving the last inserted slot, the coil conductor is inserted in a slot that is distanced by 180 electrical degrees from the last inserted slot, and starts being reversely wound around the teeth to form another stator magnetic pole of the same phase.

Another embodiment preferably provides an electric motor wherein the coil conductor is so wound that a normally wound coil unit spans 180 electrical degrees in the circumferential direction to form a normally wound stator magnetic pole; the coil conductor of the normally wound coil unit leaves the last inserted slot; the coil conductor, after leaving the last inserted slot, enters a slot distanced by 180 electrical degrees from the last inserted slot; and another normally wound coil unit is formed by winding the coil conductor in the same direction as around the normally wound stator magnetic pole, to form another normally wound stator magnetic pole, and wherein the coil conductor is so wound that a reversely wound coil unit spans 180 electrical degrees in the circumferential direction to form a reversely wound stator magnetic pole within the region of 180 electrical degrees between the above described two normally wound coil units, so that the phase of the current through the coil unit wound around the reversely wound stator magnetic pole is shifted by 180 degrees from the phase of the current through the coil unit wound around the normally wound stator magnetic pole; the coil conductor of the reversely wound coil unit leaves the last inserted slot; the coil conductor, after leaving the last inserted slot, enters a slot distanced by 180 electrical degrees from the last inserted slot; and another reversely wound coil unit is formed by winding the coil conductor in the same direction as around the reversely wound stator magnetic pole to form another reversely wound stator magnetic pole.

Another embodiment preferably provides an electric motor wherein a third coil group different from the normally wound coil unit and the reversely wound coil unit, is added to the coil structure as described just above; the added coil group is in the wave winding, and each coil unit of the wave winding spans 180 electrical degrees so that the coil conductor passes through one of the slots in which the normally wound coil unit is inserted and one of the slots in which the reversely wound coil unit is inserted.

Another embodiment preferably provides an electric motor wherein the coil conductor is so wound that a normally wound coil unit in the wave winding configuration spans 180 electrical degrees in the circumferential direction to form a normally wound stator magnetic pole; the coil conductor of the normally wound coil unit leaves the last inserted slot; the coil conductor, after leaving the last inserted slot, enters a slot distanced by 180 electrical degrees from the last inserted slot; and another normally wound coil unit is formed by winding the coil conductor in the wave winding configuration in the same direction as around the normally wound stator magnetic pole, to form another normally wound stator magnetic pole, and wherein the coil conductor is so wound that a reversely wound coil unit in the wave winding configuration spans 180 electrical degrees in the circumferential direction to form a reversely wound stator magnetic pole within the region of 180 electrical degrees between the above described two normally wound coil units, so that the phase of the current through the coil unit wound around the reversely wound stator magnetic pole is shifted by 180 degrees from the phase of the current through the coil unit wound around the normally wound stator magnetic pole; the coil conductor of the reversely wound coil unit leaves the last inserted slot; the coil conductor, after leaving the last inserted slot, enters a slot distanced by 180 electrical degrees from the last inserted slot; and another reversely wound coil unit is formed by winding the coil conductor in the wave winding configuration in the same direction as around the reversely wound stator magnetic pole to form another reversely wound stator magnetic pole.

Another embodiment preferably provides an electric motor comprising a rotor having plural magnetic poles in the circumferential direction and a stator having a first group of windings and a second group of windings of the same configuration as the first group of windings, wherein the phase difference in electrical angle between the two groups of windings falls within a range of 20~40 electrical degrees.

Another embodiment preferably provides an electric motor as described just above, wherein each of the two groups of windings constitutes magnetic poles for three-phase system; the coil unit of the first winding group and the coil unit of the second winding group, whose phases differ by 20~40 electrical degrees from each other, span adjacent teeth; and one coil side of each coil unit is inserted in a slot remotely from the rotor while the other coil side of the same coil unit is inserted in another slot closely to the rotor, so that the coil end portions of the two coil units may not overlap each other.

Another embodiment preferably provides an electric motor wherein the stator core has twelve slots within the range of 360 electrical degrees; and each coil unit spans 90, 120 or 150 electrical degrees in the circumferential direction.

Another embodiment preferably provides an electric motor comprising a rotor and a stator, wherein the rotor has plural magnetic poles in the circumferential direction; the stator has a first group of windings and a second group of windings different in configuration from the first group of windings; the phase difference in electrical angle between the two groups of windings falls within a range of 20~40 electrical degrees; and the numbers of the coil elements inserted in the individual slots are the same.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An electric rotating machine, comprising:
a rotor having plural magnetic poles along its periphery; and
a stator having teeth that are disposed opposite to the periphery of the rotor, wherein
coil conductors are wound on the stator so that two stator magnetic poles may be formed by two coil units of a phase wound around stator teeth within a range of 360 electrical degrees subtended by the magnetic poles of the rotor;
each of the two coil units forming the stator magnetic poles spans an electrical angle equal to or less than 180 electrical degrees;
each coil unit has multiple turns within a range narrower than 180 electrical degrees;
the coil turns of the two coil units forming the two stator magnetic poles are laid out such that they may not overlap each other;
the coil conductors are so wound that adjacent stator magnetic poles exhibit opposite magnetic polarities; and
two coil units forming two adjacent stator magnetic poles are staggered by 180 electrical degrees from each other.

2. An electric rotating machine, comprising:
a rotor having plural magnetic poles along its periphery; and
a stator having teeth that are disposed opposite to the periphery of the rotor, wherein
coil conductors are wound on the stator so that two stator magnetic poles may be formed by two coil units of a phase wound around stator teeth within a range of 360 electrical degrees subtended by the magnetic poles of the rotor;
each of the two coil units forming the stator magnetic poles spans an electrical angle equal to or less than 180 electrical degrees;
each coil unit has multiple turns within a range narrower than 180 electrical degrees;
the coil turns of the two coil units forming the two stator magnetic poles are laid out such that they may not overlap each other;
the coil conductors are so wound that adjacent stator magnetic poles exhibit opposite magnetic polarities; and
each coil unit of each phase coil group, having plural turns, is inserted in the stator slots spans 90, 120 or 150 electrical degrees in the circumferential direction.

3. The electric rotating machine of claim 2, wherein one coil side of each coil unit is inserted in a slot remotely from the rotor while another coil side of a same coil unit is inserted in another slot, close to the rotor.

4. The electric rotating machine of claim 2, wherein the coil conductors are wound on the stator so that two magnetic poles of a phase, formed by two coil units of a same phase, each having two or two-and-a-half turns, are disposed within a range of 360 electrical degrees subtended by the magnetic poles of the rotor.

5. An electric rotating machine, comprising:
a rotor having plural magnetic poles along its periphery; and
a stator having teeth that are disposed opposite to the periphery of the rotor, wherein
coil conductors are wound on the stator so that two stator magnetic poles may be formed by two coil units of a phase wound around stator teeth within a range of 360 electrical degrees subtended by the magnetic poles of the rotor;
each of the two coil units forming the stator magnetic poles spans an electrical angle equal to or less than 180 electrical degrees;
each coil unit has multiple turns within a range narrower than 180 electrical degrees;
the coil turns of the two coil units forming the two stator magnetic poles are laid out such that they may not overlap each other;
the coil conductors are so wound that adjacent stator magnetic poles exhibit opposite magnetic polarities; and
the coil conductor is wound such that each of the coil units of each phase coil group spans 180 electrical degrees to form a stator magnetic pole for one of the three-phases; after being wound around the teeth forming the stator magnetic pole of a phase, the coil conductor then leaves the slot where it was last inserted; and after leaving the last inserted slot, the coil conductor is then inserted in a slot that is distanced by 180 electrical degrees from the last inserted slot, and is wound in the opposite direction with respect to the direction of winding the coil conductor around the stator magnetic pole, to form another stator magnetic pole of the same phase.

6. An electric rotating machine, comprising:
a rotor having plural magnetic poles along its periphery; and
a stator having teeth that are disposed opposite to the periphery of the rotor, wherein
coil conductors are wound on the stator so that two stator magnetic poles may be formed by two coil units of a phase wound around stator teeth within a range of 360 electrical degrees subtended by the magnetic poles of the rotor;
each of the two coil units forming the stator magnetic poles spans an electrical angle equal to or less than 180 electrical degrees;
each coil unit has multiple turns within a range narrower than 180 electrical degrees;
the coil turns of the two coil units forming the two stator magnetic poles are laid out such that they may not overlap each other;
the coil conductors are so wound that adjacent stator magnetic poles exhibit opposite magnetic polarities; and
the coil conductor is wound such that each of the coil units of each phase coil group has a number of turns equal to an integer plus half unity, and spans 180 electrical degrees to form a stator magnetic pole for one of the three phases; after being wound around the teeth forming the stator magnetic pole, the coil conductor then leaves the slot where it was last inserted; and after leaving the last inserted slot, the coil conductor is inserted in a slot that is distanced by 180 electrical degrees from the last inserted slot, and is reversely wound around the teeth to form another stator magnetic pole of the same phase.

7. An electric rotating machine, comprising:
a rotor having plural magnetic poles along its periphery; and
a stator having teeth that are disposed opposite to the periphery of the rotor, wherein
coil conductors are wound on the stator so that two stator magnetic poles may be formed by two coil units of a phase wound around stator teeth within a range of 360 electrical degrees subtended by the magnetic poles of the rotor;
each of the two coil units forming the stator magnetic poles spans an electrical angle equal to or less than 180 electrical degrees;
each coil unit has multiple turns within a range narrower than 180 electrical degrees;
the coil turns of the two coil units forming the two stator magnetic poles are laid out such that they may not overlap each other;
the coil conductors are so wound that adjacent stator magnetic poles exhibit opposite magnetic polarities; and
the coil conductor is wound so that a normally wound coil unit spans 180 electrical degrees in the circumferential direction to form a normally wound stator magnetic pole; the coil conductor of the normally wound coil unit leaves the last inserted slot; the coil conductor, after leaving the last inserted slot, enters a slot distanced by 180 electrical degrees from the last inserted slot; and another normally wound coil unit is formed by winding the coil conductor in a same direction as around the normally wound stator magnetic pole, to form another normally wound stator magnetic pole, and
wherein the coil conductor is wound so that a reversely wound coil unit spans 180 electrical degrees in the circumferential direction to form a reversely wound stator magnetic pole within the region of 180 electrical degrees between the above described two normally wound coil units, so that the phase of the current through the coil unit wound around the reversely wound stator magnetic pole is shifted by 180 degrees from the phase of the current through the coil unit wound around the normally wound stator magnetic pole; the coil conductor of the reversely wound coil unit leaves the last inserted slot; the coil conductor, after leaving the last inserted slot, enters a slot distanced by 180 electrical degrees from the last inserted slot; and another reversely wound coil unit is formed by winding the coil conductor in the same direction as around the reversely wound stator magnetic pole to form another reversely wound stator magnetic pole.

8. The electric rotating machine of claim 7, wherein a third coil group different from the normally wound coil unit and the reversely wound coil unit is added to the coil structure; the third coil group is in a wave winding configuration, and each coil unit of the wave winding spans 180 electrical degrees so that the coil conductor passes through one of the slots in which the normally wound coil unit is inserted and one of the slots in which the reversely wound coil unit is inserted.

9. An electric rotating machine, comprising:
a rotor having plural magnetic poles along its periphery; and
a stator having teeth that are disposed opposite to the periphery of the rotor, wherein
coil conductors are wound on the stator so that two stator magnetic poles may be formed by two coil units of a phase wound around stator teeth within a range of 360 electrical degrees subtended by the magnetic poles of the rotor;
each of the two coil units forming the stator magnetic poles spans an electrical angle equal to or less than 180 electrical degrees;
each coil unit has multiple turns within a range narrower than 180 electrical degrees;
the coil turns of the two coil units forming the two stator magnetic poles are laid out such that they may not overlap each other;
the coil conductors are so wound that adjacent stator magnetic poles exhibit opposite magnetic polarities; and
the coil conductor is wound so that a normally wound coil unit in a wave winding configuration spans 180 electrical degrees in the circumferential direction to form a normally wound stator magnetic pole; the coil conductor of the normally wound coil unit leaves the last inserted slot; the coil conductor, after leaving the last inserted slot, enters a slot distanced by 180 electrical degrees from the last inserted slot; and another normally wound coil unit is formed by winding the coil conductor in the wave winding configuration in the same direction as around the normally wound stator magnetic pole, to form another normally wound stator magnetic pole, and
wherein the coil conductor is so wound that a reversely wound coil unit in the wave winding configuration spans 180 electrical degrees in the circumferential direction to form a reversely wound stator magnetic pole within the region of 180 electrical degrees between the above described two normally wound coil units, so that the phase of the current through the coil unit wound around the reversely wound stator magnetic pole is shifted by 180 degrees from the phase of the current through the coil unit wound around the normally wound stator magnetic pole; the coil conductor of the reversely wound coil unit leaves the last inserted slot; the coil conductor, after leaving the last inserted slot, enters a slot distanced by 180 electrical degrees from the last inserted slot; and another reversely wound coil unit is formed by winding the coil conductor in the wave winding configuration in the same direction as around the reversely wound stator magnetic pole to form another reversely wound stator magnetic pole.

10. An electric rotating machine, comprising:
a rotor having plural magnetic poles in the circumferential direction; and
a stator having a first group of windings and a second group of windings of the same configuration as the first group of windings, wherein the phase difference in electrical angle between the first and second groups of windings falls within a range of 20 to 40 electrical degrees;
wherein the stator core has twelve slots within the range of 360 electrical degrees; and each coil unit spans 90, 120 or 150 electrical degrees in the circumferential direction.

* * * * *